(12) United States Patent
Enjoji et al.

(10) Patent No.: US 11,101,466 B2
(45) Date of Patent: Aug. 24, 2021

(54) CARBON ELECTRODE MATERIAL FOR REDOX FLOW BATTERY, AND MANUFACTURING METHOD THEREOF

(71) Applicants: TOYOBO CO., LTD., Osaka (JP); SUMITOMO ELECTRIC INDUSTRIES, LTD., Osaka (JP)

(72) Inventors: Toshikatsu Enjoji, Otsu (JP); Takahiro Matsumura, Otsu (JP); Ryouhei Iwahara, Otsu (JP); Masaru Kobayashi, Otsu (JP); Masako Tatsuta, Otsu (JP); Yongrong Dong, Osaka (JP); Masayuki Oya, Osaka (JP); Kenichi Itou, Osaka (JP); Yoshiyasu Kawagoe, Osaka (JP)

(73) Assignees: TOYOBO CO., LTD., Osaka (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 17 days.

(21) Appl. No.: 16/644,033

(22) PCT Filed: Aug. 29, 2018

(86) PCT No.: PCT/JP2018/032014
§ 371 (c)(1),
(2) Date: Mar. 3, 2020

(87) PCT Pub. No.: WO2019/049756
PCT Pub. Date: Mar. 14, 2019

(65) Prior Publication Data
US 2020/0373583 A1      Nov. 26, 2020

(30) Foreign Application Priority Data

Sep. 7, 2017   (JP) .............................. JP2017-172122
Sep. 7, 2017   (JP) .............................. JP2017-172123
Sep. 7, 2017   (JP) .............................. JP2017-172124

(51) Int. Cl.
*H01M 4/66*       (2006.01)
*H01M 8/18*       (2006.01)

(52) U.S. Cl.
CPC ........... *H01M 4/663* (2013.01); *H01M 8/188* (2013.01)

(58) Field of Classification Search
None
See application file for complete search history.

(56) References Cited

U.S. PATENT DOCUMENTS

| 6,509,119 B1 | 1/2003 | Kobayashi et al. |
| 2008/0254296 A1 | 10/2008 | Handa et al. |
| 2013/0157162 A1 | 6/2013 | Dong et al. |

FOREIGN PATENT DOCUMENTS

| JP | 60-232669 A | 11/1985 |
| JP | 5-234612 A | 9/1993 |

(Continued)

OTHER PUBLICATIONS

International Search Report dated Nov. 20, 2018, issued in counterpart International Application No. PCT/JP2018/032014, with English Translation. (4 pages).

(Continued)

*Primary Examiner* — Wyatt P McConnell
(74) *Attorney, Agent, or Firm* — Westerman, Hattori, Daniels & Adrian, LLP

(57) ABSTRACT

A carbon electrode material is disclosed for a redox flow battery that particularly, even when using an Mn—Ti type electrolyte, while stabilizing Mn ions and suppressing a rise in cell resistance during initial charge and discharge, has excellent oxidation resistance. The electrode material includes a carbonaceous fiber, and a carbonaceous material for binding the carbonaceous fiber, and satisfies the require- (Continued)

ments: (1) when the size of a crystallite in a c axis direction found by X-ray diffraction in the carbonaceous material (B) is Lc(B), Lc(B) is 10 nm or greater; (2) when the size of the crystallite in the c axis direction found by X-ray diffraction in the carbonaceous fiber (A) is Lc(A), Lc(B)/Lc(A) is 1.0 or greater; and (3) the number of bonded oxygen atoms of the carbon electrode material surface is 1.0% or greater than the total number of carbon atoms of the carbon electrode material surface.

18 Claims, 3 Drawing Sheets

(56) References Cited

FOREIGN PATENT DOCUMENTS

| | | |
|---|---|---|
| JP | H9-320590 A | 12/1997 |
| JP | 2000-357520 A | 12/2000 |
| JP | 2001-85028 A | 3/2001 |
| JP | 2001-196071 A | 7/2001 |
| JP | 2006-265751 A | 10/2006 |
| JP | 2012-204135 A | 10/2012 |
| JP | 2017-33757 A | 2/2017 |
| JP | 2017-33758 A | 2/2017 |
| JP | 2017-76485 A | 4/2017 |
| WO | 2017/022564 A1 | 2/2017 |

OTHER PUBLICATIONS

Extended (Supplementary) European Search Report dated May 6, 2021, issued in counterpart EP application No. 18854985.1. (11 pages).

[FIG. 1]
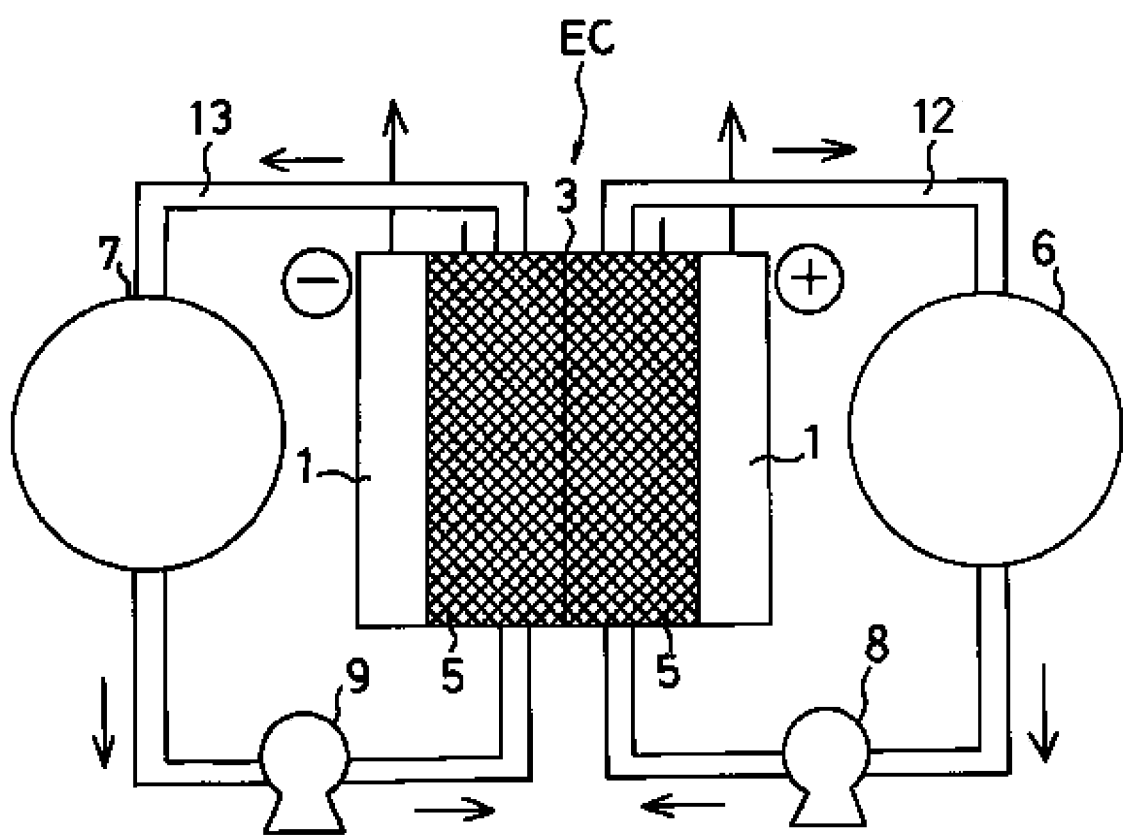

[FIG. 2]
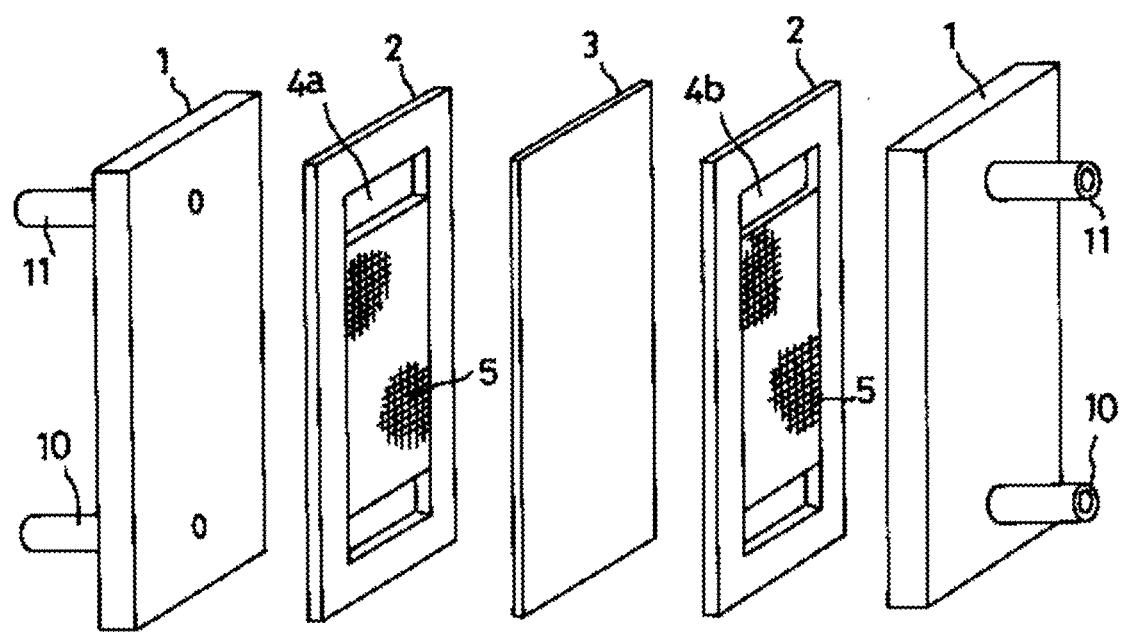

[FIG. 3]
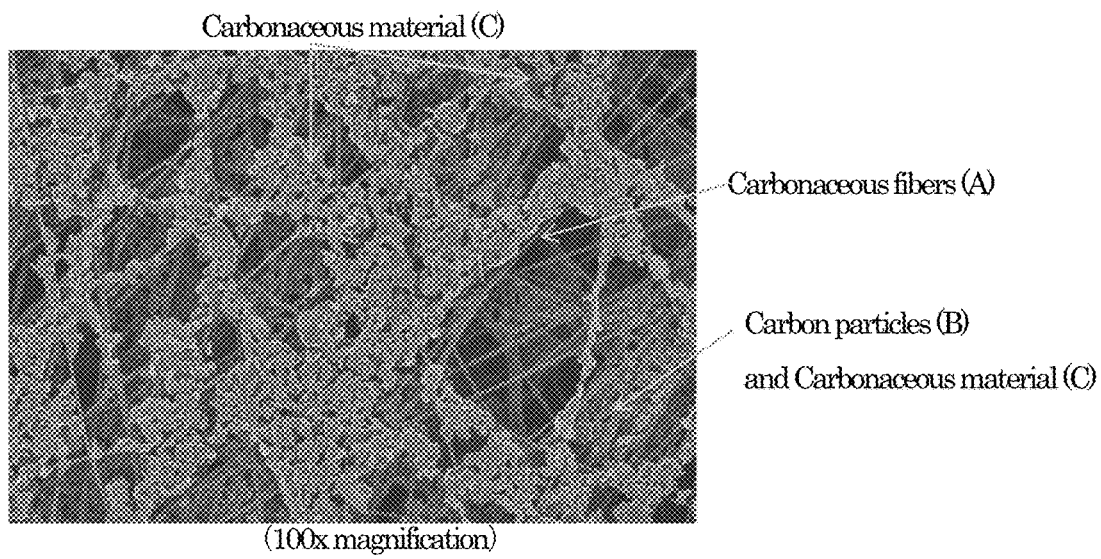
(100x magnification)
[FIG. 4]
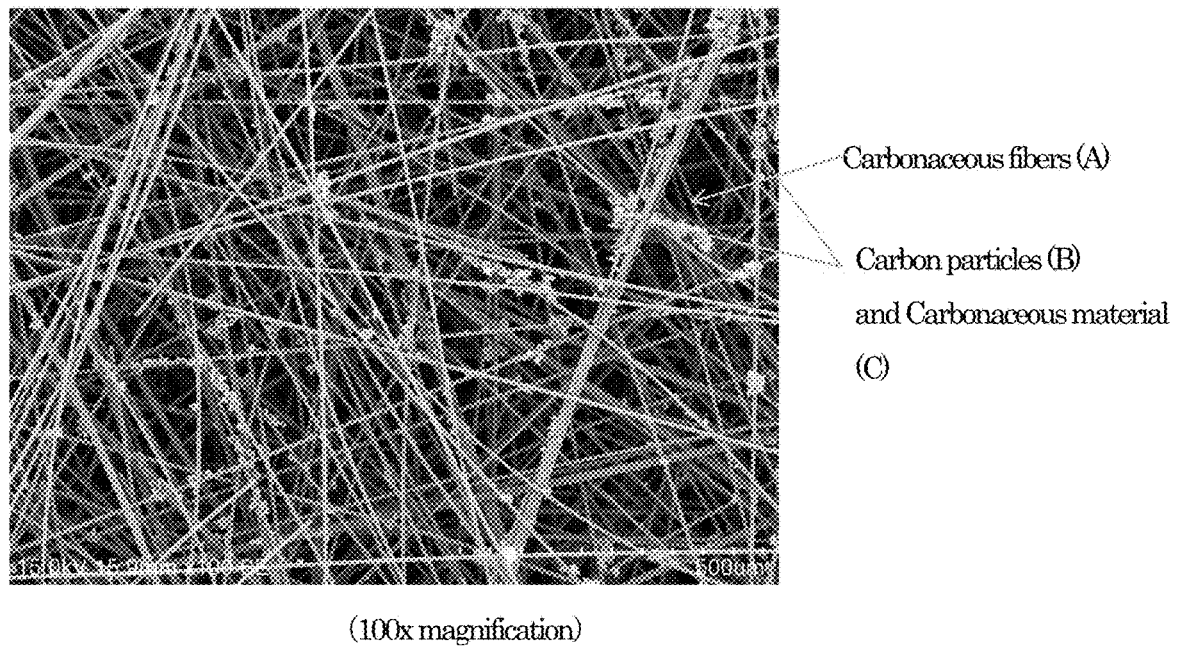
(100x magnification)

CARBON ELECTRODE MATERIAL FOR REDOX FLOW BATTERY, AND MANUFACTURING METHOD THEREOF

TECHNICAL FIELD

The present invention relates to a carbon electrode material used in a redox flow battery and a method for producing the same.

BACKGROUND ART

A redox flow battery is a battery that utilizes oxidation-reduction of redox ions in an aqueous solution. The oxidation-reduction is a mild reaction in a liquid phase only, and thus such a redox flow battery is a very safe large-capacity storage battery.

The redox flow battery mainly comprises, as shown in FIG. 1, external tanks 6 and 7 for storing respective electrolytes (positive-electrode electrolyte and negative-electrode electrolyte) and an electrolytic cell EC. In the electrolytic cell EC, an ion exchange membrane 3 is interposed between counter-opposing two collector plates 1 and 1. In the redox flow battery, while pumps 8 and 9 are sending the electrolyte containing an active material from the external tanks 6 and 7 to the electrolytic cell EC, an electrode 5 incorporated in the electrolytic cell EC performs electrochemical energy conversion, i.e. charge and discharge. As a material of the electrode 5, a carbon material having chemical resistance, electro-conductivity, and liquid permeability is used.

As an electrolyte used in a redox flow battery, an aqueous solution containing a metal ion having a valence which changes by oxidation-reduction is representatively used. The electrolyte has been changed from a type using an aqueous solution of iron and hydrochloric acid in a positive electrode and an aqueous solution of chromium and hydrochloric acid in a negative electrode to a type using in both electrodes an aqueous solution of vanadium sulfate having a higher electromotive force, and thus improved to have a higher energy density.

In the case of a redox-flow type battery using a sulfuric acid aqueous solution of vanadium oxysulfate as its positive-electrode electrolyte and a sulfuric acid aqueous solution of vanadium sulfate as its negative-electrode electrolyte, at the time of discharge, an electrolyte containing $V^{2+}$ is supplied to a liquid passage at the negative electrode, and an electrolyte containing $V^{5+}$ (actually ions containing oxygen) is supplied to a liquid passage at the positive electrode. At the liquid passage of the negative electrode, in a three-dimensional electrode, $V^{2+}$ releases electrons to be oxidized into $V^{3+}$. These released electrons pass through an external circuit and reduces, within the three-dimensional electrode of the positive electrode, $V^{5+}$ into $V^{4+}$ (actually ions containing oxygen). As this oxidation-reduction reaction goes on, the electrolyte at the negative electrode runs short of $SO_4^{2-}$ and the electrolyte at the positive electrode has an excessive amount of $SO_4^{2-}$ so that $SO_4^{2-}$ moves from the positive electrode through the ion-exchange membrane to the negative electrode, thus maintaining a charge balance. Or H+ moves from the negative electrode through the ion-exchange membrane to the positive electrode, thus maintaining the charge balance. At the time of charge, the reaction opposite to that for discharge proceeds.

The electrode materials for redox flow batteries must have the following performance as their properties:

1) No side reactions occurring other than desired reactions (high reaction selectivity), specifically, high current efficiency ($\eta_I$);
2) High electrode reaction activity, specifically, small cell resistance (R), that is, high voltage efficiency ($\eta v$);
3) High battery energy efficiency ($\eta_E$) related to the above-mentioned items 1) and 2): $\eta_E = \eta_I \times \eta_v$; and
4) Less deterioration against repetitive use (prolonged service life), specifically, less deterioration of battery energy efficiency ($\eta_E$).

Patent Document 1, for example, discloses a carbonaceous material having a specific quasi-graphite microcrystal structure with high crystallinity as an electrode material for an Fe—Cr battery capable of increasing the total energy efficiency of the battery. Specifically, Patent Document 1 discloses a carbonaceous material that has an quasi-graphite microcrystal having an average of 3.70 Å or less of a <002> interplanar spacing and an average of 9.0 Å or more of a crystallite size in the c-axis direction determined by X-ray wide-angle analysis, and also that has a total acid functional group amount of at least 0.01 meq/g.

Patent Document 2 discloses, for an electrode used in an electrolytic cell of an iron-chromium redox flow battery that can enhance the energy efficiency of the battery and also can improve the charge-discharge cycle service life, a carbon electrode material containing carbonaceous fibers made of polyacrylonitrile fiber and being composed of carbon having an quasi-graphite crystal structure with a <002>interplanar spacing of 3.50 to 3.60 Å as determined by X-ray wide-angle analysis, in which the number of bound oxygen atoms onto the surface of the carbon is 10 to 25% of the number of carbon atoms.

Patent Document 3 discloses, as a carbon electrode material used for a vanadium redox flow battery that is excellent in the energy efficiency of the overall battery system and also has less changes in its performance accompanied by a prolonged period of services, a carbon electrode material having a quasi-graphite crystal structure in which a <002> interplanar spacing is 3.43 to 3.60 Å, a crystallite size in the c-axis direction is 15 to 33 Å, and a crystallite size in the a-axis direction is 30 to 75 Å, each determined by X-ray wide-angle analysis, and in which the amount of surface acidic-functional-groups is 0.2 to 1.0% of the total number of surface carbon atoms, and the number of surface bound-nitrogen atoms is 3% or less of the total number of surface carbon atoms, each determined by XPS surface analysis.

Patent Document 4 discloses, as a carbon electrode material that can enhance the total efficiency of a vanadium redox flow battery and has a lower cell resistance during initial charge, an electrode material comprising a carbon composite material in which carbon fine particles having a crystal structure of a <002> interplanar spacing of 3.43 to 3.70 Å and an average primary particle diameter of 30 nm or more and 5 μm or less as determined by X-ray wide-angle analysis adhere to carbonaceous fibers. The carbon composite material has a crystal structure in which a <002> interplanar spacing is 3.43 to 3.60 Å, a crystallite size in the c-axis direction is 15 to 35 Å, and a crystallite size in the a-axis direction is 30 to 75 Å, each determined by X-ray wide-angle analysis. Patent Document 4 describes that, in the carbon composite material, preferably, the carbonaceous fibers and the carbon fine particles are close to each other, or are bonded with an adhesive such as phenol resin, and by using the adhesive, it is possible to fix only the originally contacting portions of the carbonaceous fibers without excessively decreasing the surfaces of the carbonaceous fibers, which serve as an electrochemical reaction field. It is disclosed in the examples that a nonwoven fabric is immersed in a solution containing 5% by weight of carbon fine particles (phenol resin) (Example 1) or 5% by weight of phenol resin (Examples 2 to 4) and then subjected to a carbonization and a dry oxidation treatment to obtain a carbonaceous-fiber nonwoven fabric.

Many efforts have been still made to develop an electrolyte used in a redox flow battery. For example, Patent Document 5 proposes, as an electrolyte that has a higher electromotive force than that of the above-mentioned vanadium electrolyte and can be supplied stably at low cost, an electrolyte (for example, Mn—Ti electrolyte) in which manganese is used in a positive electrode, and chromium, vanadium, or titanium is used in a negative electrode.

PRIOR ART DOCUMENT

Patent Document

Patent Document 1: JP S60-232669 A
Patent Document 2: JP H05-234612 A
Patent Document 3: JP 2000-357520 A
Patent Document 4: JP 2017-33758 A
Patent Document 5: JP 2012-204135 A

DISCLOSURE OF THE INVENTION

Problems to be Solved by the Invention

As described above, a redox flow battery using a Mn—Ti electrolyte has attracted attention because such a redox flow battery has a high electromotive force, and in addition, both Mn and Ti are inexpensive and abundant materials. However, a Mn ion is unstable in an aqueous solution and has a slow reaction rate, so that the cell resistance rises. Moreover, it is thought that, due to the following disproportionation reaction, a Mn ion (positive-electrode charging solution) is oxidized during charge and solid $MnO_2$ is precipitated, resulting in deterioration in the electrode material. In particular, a highly demanded property for the Mn—Ti redox flow battery is to prevent oxidation of Mn ions (oxidation resistance), but this point has not been considered in the above-mentioned Patent Documents 2 to 4 at all.

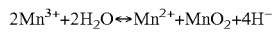

$2Mn^{3+} + 2H_2O \leftrightarrow Mn^{2+} + MnO_2 + 4H^-$

Furthermore, it was found that when the electrode materials used for the vanadium electrolytes as disclosed in Patent Documents 2 to 4 are used as a carbonaceous electrode material of a redox flow battery using the Mn—Ti electrolyte (hereinafter may be referred to as "Mn—Ti redox flow battery") as disclosed in Patent Document 5, the cell resistance significantly rises during initial charge and discharge, and the battery energy efficiency decreases.

As shown in the following disproportionation reaction, a Mn ion is unstable in an aqueous solution and has a slow reaction rate, so that the cell resistance rises. In addition, it was also found that the electrode material is deteriorated because a Mn ion (positive-electrode charging solution) generated during charge has strong oxidizing power. In particular, an oxidation resistance to Mn ions is a highly demanded property for a Mn—Ti redox flow battery. The above problems cannot be sufficiently solved only by using the electrode materials for redox flow batteries disclosed in the above-mentioned Patent Documents 2 to 4, and it is difficult to achieve both high oxidation resistance and low resistance.

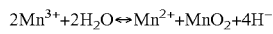

$2Mn^{3+} + 2H_2O \leftrightarrow Mn^{2+} + MnO_2 + 4H^-$

In order to further spread a redox flow battery using a Mn—Ti electrolyte (hereinafter may be referred to as "Mn—Ti redox flow battery"), a further reduction in resistance and an inexpensive electrode material are required.

The present invention has been made in view of the above circumstances, and an object of the present invention is to provide a carbon electrode material that has an excellent oxidation resistance while suppressing a rise in cell resistance during initial charge and discharge by stabilizing a Mn ion (positive-electrode charging solution) even when a Mn—Ti electrolyte is used, and a method for producing such a carbon electrode material.

Solution to the Problems

Followings describe the first to third carbon electrode materials of the present invention which can solve above problems.

(I) The First Carbon Electrode Material

[1] A carbon electrode material for a redox flow battery comprising carbonaceous fibers (A) and a carbonaceous material (B) that binds the carbonaceous fibers (A), the carbon electrode material satisfying the following requirements:

(1) when a crystallite size in a c-axis direction determined by X-ray diffraction in the carbonaceous material (B) is taken as Lc (B), the Lc (B) is 10 nm or more;

(2) when a crystallite size in a c-axis direction determined by X-ray diffraction in the carbonaceous fibers (A) is taken as Lc (A), Lc (B)/Lc (A) is 1.0 or more; and (3) the number of bound oxygen atoms onto a surface of the carbon electrode material is 1.0% or more of the total number of carbon atoms on the surface of the carbon electrode material.

[2] The carbon electrode material according to above [1], wherein the carbonaceous material (B) is contained in a mass ratio of 20% or more, relative to the total amount of the carbonaceous fibers (A) and the carbonaceous material (B).

[3] The carbon electrode material according to above [1] or [2], wherein the Lc (A) is 1 to 10 nm.

[4] The carbon electrode material according to any of above [1] to [3], wherein a water passing rate when a water droplet is dropped on the carbon electrode material is 0.5 mm/sec or more.

[5] The carbon electrode material according to any of above [1] to [4], which is used in a negative electrode of a redox flow battery using a manganese-titanium electrolyte.

[6] A redox flow battery comprising the carbon electrode material according to any of above [1] to [5].

[7] A manganese-titanium redox flow battery using the carbon electrode material according to any of above [1] to [5].

[8] A method for producing the carbon electrode material according to any of above [1] to [5], the method comprising in the following order:

a step of impregnating the carbonaceous fibers (A) with the carbonaceous material (B) before being carbonized;

a carbonization step of heating a product after being impregnated, in an inert atmosphere, at a temperature of 800° C. or higher and 2000° C. or lower;

a graphitization step of heating the product, in an inert atmosphere, at a temperature that is 1800° C. or higher and that is higher than the heating temperature of the carbonization step; and an oxidation treatment step of the product.

(II) The Second Carbon Electrode Material

[11] A carbon electrode material for a redox flow battery comprising carbonaceous fibers (A), graphite particles (B), and a carbonaceous material (C) that binds the carbonaceous fibers (A) and the graphite particles (B), the carbon electrode material satisfying the following requirements:

(1) the graphite particles (B) has a particle diameter of 1 μm or more;

(2) when a crystallite size in a c-axis direction determined by X-ray diffraction in the graphite particles (B) is taken as Lc (B), the Lc (B) is 35 nm or more;

(3) when a crystallite size in a c-axis direction determined by X-ray diffraction in the carbonaceous material (C) is taken as Lc (C), the Lc (C) is 10 nm or more;

(4) when a crystallite size in a c-axis direction determined by X-ray diffraction in the carbonaceous fibers (A) is taken as Lc (A), Lc (C)/Lc (A) is 1.0 or more; and (5) the number of bound oxygen atoms onto a surface of the carbon electrode material is 1.0% or more of the total number of carbon atoms on the surface of the carbon electrode material.

[12] The carbon electrode material according to above [11], wherein the graphite particles (B) are contained in a mass ratio of 20% or more, and the carbonaceous material (C) is contained in a mass ratio of 20% or more, relative to the total amount of the carbonaceous fibers (A), the graphite particles (B), and the carbonaceous material (C), and wherein the mass ratio of the carbonaceous material (C) to the graphite particles (B) is from 0.2 to 3.0.

[13] The carbon electrode material according to above [11] or [12], wherein the Lc (A) is 1 to 10 nm.

[14] The carbon electrode material according to any of above [11] to [13], wherein a BET specific surface area determined from an adsorbed nitrogen amount is from 1.0 to 8 $m^2/g$.

[15] The carbon electrode material according to any of above [11] to [14], wherein the graphite particles (B) comprise at least one selected from the group consisting of flaky graphite, exfoliated graphite, and expanded graphite.

[16] The carbon electrode material according to any of above [11] to [15], wherein a water passing rate when a water droplet is dropped on the carbon electrode material is 0.5 mm/sec or more.

[17] The carbon electrode material according to any of above [11] to [16], which is used in a negative electrode of a redox flow battery using a manganese-titanium electrolyte.

[18] A redox flow battery comprising the carbon electrode material according to any of above [11] to [17].

[19] A manganese-titanium redox flow battery using the carbon electrode material according to any of above [11] to [17].

[20] A method for producing the carbon electrode material according to any of above [11] to [17], the method comprising in the following order:

a step of impregnating the carbonaceous fibers (A) with the graphite particles (B) and the carbonaceous material (C) before being carbonized;

a carbonization step of heating a product after being impregnated, in an inert atmosphere, at a temperature of 800° C. or higher and 2000° C. or lower;

a graphitization step of heating the product, in an inert atmosphere, at a temperature that is 1800° C. or higher and that is higher than the heating temperature of the carbonization step; and an oxidation treatment step of the product.

(III) The Third Carbon Electrode Material

[21] A carbon electrode material for a manganese-titanium redox flow battery, the carbon electrode material being used in a negative electrode of a redox flow battery using a manganese-titanium electrolyte, wherein the carbon electrode material comprises carbonaceous fibers (A), carbon particles (B) other than graphite particles, and a carbonaceous material (B) that binds the carbonaceous fibers (A) and the carbon particles (B) other than graphite particles, and satisfies the following requirements:

(1) the carbon particles (B) other than graphite particles have a particle diameter of 1 μm or less;

(2) when a crystallite size in a c-axis direction determined by X-ray diffraction in the carbon particles (B) other than graphite particles is taken as Lc (B), the Lc (B) is 10 nm or less;

(3) when crystallite sizes in a c-axis direction determined by X-ray diffraction in the carbonaceous fibers (A) and the carbonaceous material (C) are taken as Lc (A) and Lc (C), respectively, Lc (C)/Lc (A) is 1.0 to 5;

(4) the carbonaceous material (C) is contained in a mass ratio of 14.5% or more relative to the total amount of the carbonaceous fibers (A), the carbon particles (B) other than graphite particles, and the carbonaceous material (C); and (5) the number of bound oxygen atoms onto a surface of the carbon electrode material is 1.0% or more of the total number of carbon atoms on the surface of the carbon electrode material.

[22] The carbon electrode material according to above [21], wherein the mass ratio of the carbonaceous material (C) to the carbon particles (B) is from 0.2 to 10.

[23] The carbon electrode material according to above [21] or [22], wherein a BET specific surface area determined from an adsorbed nitrogen amount is 0.5 $m^2/g$ or more.

[24] The carbon electrode material according to any of above [21] to [23], wherein a water passing rate when a water droplet is dropped on the carbon electrode material is 0.5 mm/sec or more.

[25] The carbon electrode material according to any of above [21] to [24], which is used in a negative electrode of a redox flow battery using a manganese-titanium electrolyte.

[26] A method for producing the carbon electrode material according to any of above [21] to [24], the method comprising in the following order:

a step of impregnating the carbonaceous fibers (A) with the carbon particles (B) other than graphite particles and the carbonaceous material (C) before being carbonized;

a carbonization step of heating a product after being impregnated, in an inert atmosphere, at a temperature of 800° C. or higher and 2000° C. or lower;

a graphitization step of heating the product, in an inert atmosphere, at a temperature that is 1300° C. or higher and that is higher than the heating temperature of the carbonization step; and an oxidation treatment step of the product.

Advantageous Effects of the Invention

According to the first to third carbon electrode materials of the present invention, the following advantageous effects can be obtained.

First, the first carbon electrode material has an excellent oxidation resistance while suppressing a rise in cell resistance during initial charge and discharge, and is therefore particularly useful as an electrode material for a Mn—Ti redox flow battery. Furthermore, the first carbon electrode material is suitably used in a flow type or non-flow type redox flow battery, or a redox flow battery combined with a system of lithium, a capacitor, and a fuel cell.

The second carbon electrode material can realize compatibility between high oxidation resistance and low resistance, and is therefore particularly useful as an electrode material for a Mn—Ti redox flow battery. Furthermore, the second carbon electrode material is suitably used in a flow type or non-flow type redox flow battery, or a redox flow battery combined with a system of lithium, a capacitor, and a fuel cell.

Moreover, according to the third carbon electrode material, a carbon electrode material that has a lowered cell resistance during initial charge and discharge and an excellent battery energy efficiency, which is used in a negative electrode of a Mn/Ti redox flow battery, can be obtained.

BRIEF DESCRIPTION OF THE DRAWINGS

FIG. 1 is a schematic view of a redox flow battery;

FIG. 2 is an exploded perspective view of a liquid flow-through electrolytic cell having a three-dimensional electrode suitably used in the present invention;

FIG. 3 is an SEM photograph (magnification: 100 times) of No. 1 (an example of the present invention satisfying the requirements for the second electrode material) in Table 3A in Example 3 described later; and FIG. 4 is an SEM photograph (magnification: 100 times) of No. 13 (a comparative example not satisfying the requirements for the second electrode material) in Table 3A in Example 3 described later.

MODE FOR CARRYING OUT THE INVENTION

First, the present invention will be described in detail for each constituent component with reference to FIG. 2.

FIG. 2 is an exploded perspective view of a liquid flow-through electrolytic cell suitably used in the present invention. In the electrolytic cell of FIG. 2, an ion exchange membrane 3 is interposed between counter-opposing two collector plates 1 and 1, and liquid passages 4a and 4b for an electrolyte along the inner surfaces of the collector plates 1 and 1 are formed on both sides of the ion exchange membrane 3 by spacers 2, respectively. At least one of the liquid passages 4a and 4b has therein an electrode material 5. Each collector plate 1 is provided with a liquid inlet 10 and a liquid outlet 11 for the electrolyte. As shown in FIG. 2, an electrode is configured with the electrode material 5 and the collector plate 1, and has a structure in which the electrolyte passes through the electrode material 5 (three-dimensional electrode structure). This structure allows to all the surfaces of the pores of the electrode material 5 to be used as an electrochemical reaction field while securing the transport of electrons by the collector plates 1, whereby the charge/discharge efficiency of the electrolytic cell can be improved.

Hereinafter, the first to third carbon electrode materials (5 in FIG. 2) according to the present invention will be described in detail. In this specification, the carbon electrode material may be abbreviated as "electrode material".

[I. First Carbon Electrode Material According to the Present Invention]

[I-1. Configuration of First Carbon Electrode Material]

The inventors have made intensive studies to provide a carbon electrode material preferably used especially in a Mn—Ti redox flow battery using a Mn ion as a positive-electrode active material and a Ti ion as a negative-electrode active material. Unlike a conventional vanadium redox flow battery or Fe—Cr redox flow battery, it is important that a Mn—Ti redox flow battery has an oxidation resistance to suppress the generation of precipitates such as a Mn oxide and stably perform a $Mn^{2+}/Mn^{3+}$ reaction. However, this point has not been considered in the electrode materials proposed so far.

In providing the above-mentioned carbon electrode material, the inventors first studied carbon particles. In general, as carbon particles exhibiting reaction activity in a redox flow battery, carbon particles with high reactivity, high specific surface area, and low crystallinity, such as acetylene black (acetylene soot), oil black (furnace black, oil soot), gas black (gas soot), and other carbon blacks, are often used. However, it was found that such carbon particles with low crystallinity are easily oxidized against a charging solution of positive-electrode manganese and thus cannot be used.

Consequently, the inventors have decided to adopt a carbonaceous material having binding properties to bind carbonaceous fibers (A) and the carbonaceous fibers (A), having high crystallinity, and satisfying the following requirements (1) and (2) as a carbonaceous material (B), without using carbon particles.

(1) When a crystallite size in the c-axis direction determined by X-ray diffraction is taken as Lc (B), Lc (B) is 10 nm or more; and (2) When a crystallite size in the c-axis direction determined by X-ray diffraction in the carbonaceous fibers is taken as Lc (A), Lc (B)/Lc (A) is 1.0 or more.

Here, "bind carbonaceous fibers (A) and the carbonaceous fibers (A)" (in other words, the carbonaceous material used in the first electrode material acts as a binder for the carbonaceous fibers) means that the carbonaceous material strongly binds carbonaceous fibers to each other, and when seen as the entire electrode material, it is configured such that the surfaces of the carbonaceous fibers are covered with the carbonaceous material.

However, it is preferable that the carbonaceous material after binding be not in a state of coating. Here, "not in a state of coating" means that the carbonaceous material (B) does not form a web state such as a totipalmate or palmate foot between the carbonaceous fibers (A). When the coating state is formed, the liquid permeability of the electrolyte deteriorates, and the resistance of the battery increases.

In order to obtain such a binding state, the content ratio of the carbonaceous material relative to the total amount of the carbonaceous fibers and the carbonaceous material is preferably increased, and is, for example, 20% or more in the first electrode material. In this respect, the carbonaceous material in the first electrode material differs from the carbonaceous material disclosed in the above-mentioned Patent Document 4. Patent Document 4 has only a perception that the carbonaceous material used may act as a localized adhesive under the concept that it is only necessary that only the portions of the carbonaceous fibers and the carbon fine particles that are originally in contact with each other may be fixed (bonded). Therefore, in the examples of Patent Document 4, the content of the carbonaceous material is at most 14.4%.

It was found that when the above carbonaceous material with binding properties is used, the carbonaceous material strongly binds the carbonaceous fibers and the like, so that an efficient conduction path can be formed, and an increase in resistance can be suppressed.

Furthermore, it was found that, by using the highly crystalline carbonaceous material satisfying the above (1) and (2), not only a high oxidation resistance is provided to the carbonaceous material itself, but also the effect of protecting the carbonaceous fibers against oxidative degradation is enhanced.

In addition, the first carbon electrode material satisfies the following requirement (3).

(3) The number of bound oxygen atoms onto the surface of the carbon electrode material is 1.0% or more of the total number of carbon atoms on the surface of the carbon electrode material.

This allows the introduction of oxygen atoms onto an edge plane or a defect structure portion of carbon. As a result, on the surface of the electrode material, reactive groups such as a carbonyl group, a quinone group, a lactone group, and a free radical oxide are generated by the introduced oxygen atoms, and hence these reactive groups greatly contribute to the electrode reaction, whereby the increase in resistance is further suppressed.

The first electrode material is configured as described above, so that an electrode with excellent oxidation resistance while suppressing an increase in resistance can be obtained. In particular, when the first electrode material is used as an electrode material for an electrolytic cell of a positive-electrode manganese redox flow battery, it is possible to provide a carbon electrode material with excellent oxidation resistance to a positive-electrode charging solution while suppressing a rise in cell resistance during initial charge and discharge.

As described above, the first electrode material 5 is composed of the carbonaceous fibers (A) and the carbonaceous material with binding properties to bind the carbonaceous fibers (A), and satisfies the above requirements (1) to (3).

[Carbonaceous Fibers (A)]

The carbonaceous fibers used in the first electrode material are obtained by subjecting an organic fiber precursor to a heat and carbonization treatment (details thereof will be described later) and contain carbon in a mass ratio of 90% or more (JIS L 0204-2). Examples of the organic fiber precursor used as a raw material of the carbonaceous fibers include acrylic fiber such as polyacrylonitrile; phenol fiber; PBO fiber such as polyparaphenylene benzobisoxazole (PBO); aromatic polyamide fiber; pitch fiber such as isotropic pitch fiber, anisotropic pitch fiber, and mesophase pitch; and cellulose fiber. Among these, from the viewpoints of being excellent in oxidation resistance and being excellent in strength and elastic modulus, acrylic fiber, phenol fiber, cellulose fiber, isotropic pitch fiber, and anisotropic pitch fiber are preferable as the organic fiber precursor, and acrylic fiber is more preferable. Acrylic fiber is not particularly limited as long as it contains acrylonitrile as a main component. The content of acrylonitrile in a raw material monomer constituting the acrylic fiber is preferably 95% by mass or more, and more preferably 98% by mass or more.

The mass average molecular weight of the organic fiber is not particularly limited, but is preferably 10000 or more and 100000 or less, more preferably 15000 or more and 80000 or less, and further preferably 20000 or more and 50000 or less. The mass average molecular weight can be measured by a method such as gel permeation chromatography (GPC), measuring a solution viscosity, or the like.

The average fiber diameter of the carbonaceous fibers is preferably 0.5 to 40 μm. If the average fiber diameter is smaller than 0.5 μm, the liquid permeability deteriorates. On the other hand, if the average fiber diameter is larger than 40 μm, the reaction surface area of the fiber portion decreases, and the cell resistance rises. Considering a balance between the liquid permeability and the reaction surface area, the average fiber diameter is more preferably 3 to 20 μm.

In the first electrode material, a structure composed of the above carbonaceous fibers is preferably used as a base material, whereby strength is improved, and handling and workability are facilitated. Specific examples of the structure include a sheet-like material of a spun yarn, a sheet-like material of a filament bundling yarn, a nonwoven fabric, a knitted fabric, a woven fabric, and a special knitted fabric described in Japanese Patent Publication No. S63-200467-A or the like that are made of carbonaceous fibers, and paper made of carbon fibers. Among these, a nonwoven fabric, a knitted fabric, a woven fabric, a special knitted fabric that are made of carbonaceous fibers, and paper made of carbon fibers are more preferable in terms of handling, workability, manufacturability, and the like.

When using a nonwoven fabric, a knitted fabric, a woven fabric, or the like, the average fiber length is preferably 30 to 100 mm. When using paper made of carbon fibers, the average fiber length is preferably 5 to 30 mm. By rendering the average fiber length within the above range, a uniform fiber structure can be obtained.

As described above, the carbonaceous fibers are obtained by subjecting an organic fiber precursor to a heat and carbonization treatment. Preferably, the above-mentioned "heat and carbonization treatment" includes at least a flameproofing step and a carbonization (firing) step. However, the carbonization step does not necessarily need to be performed after the flameproofing step as described above, and may be performed after the flameproofed fibers are impregnated with graphite particles and a carbonaceous material as described in the examples described later. In this case, a carbonization step after the flameproofing step can be omitted.

The flameproofing step means a step of heating an organic fiber precursor at a temperature of preferably 180° C. or higher and 350° C. or lower in an air atmosphere to obtain flameproofed organic fiber. The heat treatment temperature is more preferably 190° C. or higher, and further preferably 200° C. or higher. Moreover, the heat treatment temperature is more preferably 330° C. or lower, and further preferably 300° C. or lower. By heating in the above-mentioned temperature range, the contents of nitrogen and hydrogen in the organic fiber can be reduced while the form of carbonaceous fiber can be retained without the organic fiber being thermal decomposed, and the carbonization ratio can be improved. During the flameproofing step, since the organic fiber is thermally shrunk, the molecular orientation may be deteriorated, resulting in a reduced conductivity of the carbonaceous fibers. Therefore, the organic fiber is preferably subjected to the flameproofing treatment under tension or under stretching, and more preferably subjected to the flameproofing treatment under tension.

The carbonization step means a step of heating the flameproofed organic fiber obtained as described above, in an inert atmosphere (preferably in a nitrogen atmosphere), preferably at a temperature of 1000° C. or higher and 2000° C. or lower to obtain a carbonaceous fiber. The heating temperature is more preferably 1100° C. or higher, and further preferably 1200° C. or higher, and is more preferably 1900° C. or lower. By performing the carbonization step in the above-mentioned temperature range, carbonization of the organic fiber proceeds, and a carbonaceous fiber having a quasi-graphite crystal structure can be obtained.

Since different types of organic fibers have different crystallinities, the heating temperature in the carbonization step can be selected depending on the type of organic fiber used as a raw material.

For example, when using acrylic resin (preferably polyacrylonitrile) as organic fiber, the heating temperature is preferably 800° C. or higher and 2000° C. or lower, and more preferably 1000° C. or higher and 1800° C. or lower.

Preferably, the above-mentioned flameproofing step and carbonization step are performed continuously. The temperature rise rate when raising the temperature from the flameproofing temperature to the carbonization temperature is preferably 20° C./min or less, and more preferably 15° C./min or less. By rendering the temperature rise rate within the above range, it is possible to obtain a carbonaceous fiber that retains the shape of the organic fiber and has excellent mechanical properties. The lower limit of the temperature rise rate is preferably 5° C./min or more in consideration of mechanical properties and the like.

As described in detail in the section of the carbonaceous material (B) described later, the first electrode material satisfies that, when crystallite sizes in the c-axis direction determined by X-ray diffraction in the carbonaceous fibers (A) and the carbonaceous material (B) are taken as Lc (A) and Lc (B), respectively, Lc (B)/Lc (A) is 1.0 to 10, as specified in the above (2). Therefore, as long as the first electrode material satisfies the above (2), Lc (A) in the carbonaceous fibers (A) is not particularly limited. However, considering the oxidation resistance of the carbonaceous fiber itself and the like, Lc (A) is preferably 1 to 10 nm, and more preferably 1 to 6 nm. The measurement methods of Lc (A) and Lc (B) will be described in detail in the section of Examples below.

[Carbonaceous Material (B)]

In the first electrode material, a carbonaceous material is added as a binding agent (binder) for strongly binding carbonaceous fibers, which cannot be intrinsically bound. The first electrode material needs to satisfy that, when a crystallite size in the c-axis direction determined by X-ray diffraction in the carbonaceous material (B) is taken as Lc (B), Lc (B) is 10 nm or more, as specified in the above (1), and that, when a crystallite size in the c-axis direction determined by X-ray diffraction in the carbonaceous fibers (A) is taken as Lc (A), Lc (B)/Lc (A) is 1.0 or more, as specified in the above (2).

By using the carbonaceous material with binding properties and high crystallinity satisfying these requirements, the carbonaceous fibers are strongly bound to each other, and a high oxidation resistance is provided to the carbonaceous material itself. In addition, the surfaces of the carbonaceous fibers are covered with the carbonaceous material, and the effect of protecting the carbonaceous fibers against oxidative degradation is enhanced, whereby the oxidation resistance of the entire electrode material is also improved.

From the above viewpoints, Lc (B) is preferably 12 nm or more, and more preferably 15 nm or more. The upper limit of Lc (B) is not particularly limited from the above viewpoints, but is preferably about 40 nm or less in consideration of achieving compatibility between oxidation resistance and low resistance.

When the ratio of Lc (B)/Lc (A) is less than 1.0, the above-mentioned effects cannot be effectively exhibited. The above ratio is preferably 2 or more, and more preferably 3 or more. On the other hand, when the above ratio exceeds 10, it is difficult to achieve compatibility with low resistance. The above ratio is preferably 10 or less, and more preferably 8 or less.

The carbonaceous material (B) used in the first electrode material is preferably contained in a mass ratio of 20% or more, and more preferably 30% or more, relative to the total amount of the carbonaceous fibers (A) and the carbonaceous material (B) described above. By increasing the content of the carbonaceous material like this, the carbonaceous fibers can be sufficiently bound, and the above-mentioned effects due to the addition of the carbonaceous material are effectively exhibited, and the oxidation resistance is especially improved. The upper limit of the content of the carbonaceous material (B) is not particularly limited in respect of oxidation resistance and the like, but is preferably about 60% or less in consideration of the liquid permeability of the electrolyte. When a structure such as a nonwoven fabric or the like is used as a base material, the amount of the carbonaceous fibers (A) used for calculating the above content is the amount of this structure.

The type of the carbonaceous material (B) used in the first electrode material may be any type capable of binding the carbonaceous fibers (A). Specifically, the material is not particularly limited as long as it exhibits the binding properties at the time of carbonization when producing the first electrode material. Examples of such a material include pitch materials such as coal-tar pitch and coal pitch; resins such as phenol resin, benzoxazine resin, epoxide resin, furan resin, vinyl ester resin, melanine-formaldehyde resin, urea-formaldehyde resin, resorcinol-formaldehyde resin, cyanate ester resin, bismaleimide resin, polyurethane resin, and polyacrylonitrile resin; furfuryl alcohol; rubbers such as acrylonitrile-butadiene rubber. Commercially-available products may be used for these materials.

Among these, pitch materials such as coal-tar pitch and coal pitch, which are particularly easier to crystallize, are preferably used because a desired carbonaceous material (B) can be obtained at a low firing temperature. Polyacrylonitrile resin is also preferably used because a desired carbonaceous material (B) can be obtained by raising a firing temperature. Pitch materials are particularly preferable.

In a preferred embodiment of the first electrode material, since no phenol resin is used, no adverse effects (generation of formaldehyde and a formaldehyde odor at room temperature) associated with the use of phenol resin occur, and there are advantages such as no odor at normal temperature. On the other hand, in Patent Document 4 described above, phenol resin is used as an adhesive and therefore, in addition to the above adverse effects, there are disadvantages in respect of cost and workability, such as the necessity of a separate facility for controlling a formaldehyde concentration in a work place to be below a managed concentration.

Here, a pitch material preferably used will be described in detail. In coal-tar pitch or coal pitch described above, the content of a mesophase phase (liquid-crystalline phase) can be controlled by the temperature and the time of infusibilization treatment. If the content of the mesophase phase is low, a pitch material that melts at a relatively low temperature or that is in a liquid state at room temperature is obtained. On the other hand, if the content of the mesophase phase is high, a pitch material that melts at a high temperature and that has a high carbonization yield is obtained. When a pitch material is applied to the carbonaceous material (B), a pitch material having a low content of a mesophase phase (that is, having a low carbonization yield) is preferably used, and, for example, the content is preferably 10% or less. The melting point of the pitch material is preferably 200° C. or lower, and more preferably 100° C. or lower. The above-mentioned effects are thereby effectively exhibited. As a pitch material, it is preferable to use coal tar, which is a raw material of pitch.

[I-2. Characteristics of First Carbon Electrode Material]

The first electrode material satisfies that the number of bound oxygen atoms onto the surface of the carbon electrode material is 1.0% or more of the total number of carbon atoms on the surface of the carbon electrode material. Hereinafter, the ratio of the number of bound oxygen atoms to the total number of carbon atoms may be abbreviated as O/C. The O/C can be measured by surface analysis such as X-ray photoelectron spectroscopy (XPS) or X-ray fluorescence analysis.

When an electrode material having an O/C of 1.0% or more is used, the electrode reaction rate can be remarkably increased, and a low resistance can be realized. The hydrophilicity is also increased by controlling the O/C, and the water passing rate (preferably 0.5 mm/sec or more) of the electrode material described later can be ensured. On the other hand, when an electrode material having a low oxygen concentration with an O/C of less than 1.0% is used, the electrode reaction rate during discharge decreases, and the electrode reaction activity cannot be increased. As a result, the resistance increases. Although the details on the reason are not clear why the electrode reaction activity (in other words, voltage efficiency) is increased by the use of an electrode material having a large number of bound oxygen atoms onto the surface of the electrode material, it is considered that a large number of oxygen atoms present on the surface effectively act on the affinity between the carbonaceous material (B) and the electrolyte, transfer of electrons, desorption of complex ions from a carbonaceous material, and complex exchange reaction, and the like.

The first electrode material is excellent in hydrophilicity. The hydrophilicity can be confirmed by a water passing rate when a water droplet is dropped on the electrode material after the dry oxidation treatment. The water passing rate of the first electrode material is preferably 0.5 mm/sec or more. From this water passing rate, it can be determined to have a sufficient hydrophilicity for the electrolyte. The higher the water passing rate of the electrode material, the better, and the water passing rate of the electrode material is more preferably 1 mm/sec or more, further preferably 5 mm/sec or more, and still further preferably 10 mm/sec or more.

When the thickness of the spacer 2 sandwiched between the collector plate 1 and the ion exchange membrane 3 (hereinafter, referred to as "spacer thickness") is 0.3 to 3 mm, the basis weight of the first electrode material is preferably 50 to 500 g/m$^2$, and more preferably 100 to 400 g/m$^2$. By controlling the basis weight to be in the above range, the ion exchange membrane 3 can be prevented from being damaged while ensuring liquid permeability. In recent years, from the viewpoint of lowering the resistance, the thickness of the ion-exchange membrane 3 tends to decrease, and a treatment and a use method for reducing a damage to the ion exchange membrane 3 are extremely important. From the above viewpoint, it is more preferable to use, in the first electrode material, a nonwoven fabric or paper having one surface flattened as a base material. As a flattening method, any known method can be used, and examples thereof include a method in which a slurry is applied to one surface of carbonaceous fiber and dried; and a method in which impregnating and drying are performed on a smooth film such as PET.

The thickness of the first electrode material is preferably at least larger than the spacer thickness. For example, when a low-density material such as a nonwoven fabric is used as the carbonaceous fibers, and the graphite particles and the carbonaceous material with binding properties used in the first electrode material are supported on the carbonaceous fibers, the thickness of the first electrode material is preferably 1.5 to 6.0 times the spacer thickness. However, if the thickness of the first electrode material is too large, it may break through the ion-exchange membrane 3 due to the compressive stress of the sheet-like material. For this reason, it is preferable to use the first electrode material having a compressive stress of 9.8 N/cm$^2$ or less. In order to adjust the compressive stress according to the basis weight and thickness of the first electrode material, the first electrode material may be used in a laminated state of two layers, three layers, or the like. It is also possible to combine the first electrode material with an electrode material in another form.

[I-3. Method for Producing First Carbon Electrode Material]

Next, a method for producing the first electrode material will be described. The first electrode material can be produced by impregnating carbonaceous fibers (base material) with a carbonaceous material precursor (before being carbonized), and then letting the carbonaceous fibers go through a carbonization step, a graphitization step, and an oxidation treatment step. In each step, any known method can be used.

Hereinafter, each step will be described.

(Step of Impregnating Carbonaceous Fibers with Carbonaceous Material Precursor)

First, carbonaceous fibers are impregnated with a carbonaceous material precursor. Any known method can be adopted for this step. For example, there can be mentioned a method in which the above carbonaceous material precursor is heated and melted, and the carbonaceous fibers are immersed in the obtained melt and then cooled to room temperature. Alternatively, a method in which the above carbonaceous material precursor is dispersed in a solvent such as water or alcohol, or partially dissolved or partially dispersed in a solvent such as toluene to prepare a dispersion liquid, and the carbonaceous fibers are immersed in the dispersion liquid, and then dried by heating can be used.

Excess liquid (pick-up amount) of the above-mentioned melt, dispersion liquid, or solution with which the carbonaceous fibers are immersed can be removed, for example, by passing a product after impregnation through a nip roller with a predetermined clearance to squeeze excess liquid, or by using a doctor blade or the like to scrape excess liquid on the surface of a product after impregnation.

Thereafter, drying is performed at, for example, 80 to 150° C. in an air atmosphere.

(Carbonization Step)

The carbonization step is performed in order to fire the product after being impregnated obtained in the above step, thereby binding the carbonaceous fibers. In the carbonization step, it is preferable to sufficiently remove a decomposition gas generated during carbonization. For example, heating is preferably performed at a temperature of 800° C. or higher and 2000° C. or lower in an inert atmosphere (preferably, in a nitrogen atmosphere). The heating temperature is more preferably 1000° C. or higher, further preferably 1200° C. or higher, and still further preferably 1300° C. or higher, and is more preferably 1500° C. or lower, and further preferably 1400° C. or lower.

As described above, a treatment corresponding to the carbonization step may be performed also after flameproofing of the fiber, and the carbonization treatment after flameproofing of the fiber may be omitted. That is, a method for producing the first electrode material is broadly divided into the following methods 1 and 2.

Method 1: flameproofing of fiber→carbonization of fiber→impregnation with carbonaceous material→carbonization→graphitization→oxidation Method 2: flameproofing of fiber→impregnation with carbonaceous material→carbonization→graphitization→oxidation According to the above method 1, although the processing cost increases because the carbonization is performed twice, a sheet used as the electrode material is hardly affected by a difference in volume shrinkage ratio, and thus, there is an advantage that the obtained sheet is unlikely to deform (warp). On the other hand, according to the above method 2, the carbonization step may be performed only once, so that the processing cost can be reduced. However, the sheet obtained tends to deform due to a difference in volume shrinkage ratio at the time of carbonization of each material. The choice as to which of the above methods 1 and 2 should be adopted may be appropriately made in consideration of the above points.

(Graphitization Step)

The graphitization step is performed in order to sufficiently increase the crystallinity of the carbonaceous material and develop a high oxidation resistance. After the carbonization step, it is preferable to further perform heating in an inert atmosphere (preferably in a nitrogen atmosphere) at a temperature that is 1800° C. or higher and that is higher than the heating temperature in the carbonization step, and more preferably 2000° C. or higher. The upper limit of the heating temperature in the graphitization step is preferably 3000° C. or lower in consideration of a load applied to equipment and the like.

Patent Document 4 described above differs from the method for producing the first electrode material in that the graphitization step is not performed. Therefore, the electrode material of Patent Document 4 does not satisfy the requirements for the first electrode material (Lc of the carbonaceous material (B) is 10 nm or more).

(Oxidation Treatment Step)

After the graphitization step, an oxidation treatment step is further performed, so that an oxygen-functional group such as a hydroxyl group, a carbonyl group, a quinone group, a lactone group, and a free-radical oxide is introduced to the surface of the electrode material. As a result, the above-mentioned O/C ratio≥1% can be achieved. Since these oxygen-functional groups greatly contribute to the electrode reaction, a sufficiently low resistance can be obtained. In addition, the water passing rate can be increased.

As the oxidation treatment step, various treatment steps such as wet chemical oxidation, electrolytic oxidation, and dry oxidation can be used, and a dry oxidation treatment step is preferred from the viewpoints of workability and production costs. The dry oxidation treatment step means a step of heating (oxidizing treatment) in an air atmosphere, for example, at 500° C. or higher and 900° C. or lower. In order to effectively exert the effect of the introduction of the oxygen-functional group, the heating temperature is more preferably 600° C. or higher, and further preferably 650° C. or higher. In addition, the heating temperature is more preferably 800° C. or lower, and further preferably 750° C. or lower.

Furthermore, in the dry oxidation treatment step, it is preferable to adjust a mass yield of the electrode material before and after the oxidation treatment to 90% or more and 96% or less from the viewpoint of maintaining the mechanical strength of the electrode material. The mass yield can be adjusted by a method such as appropriately adjusting a treatment time and temperature of dry air oxidation.

[II. Second Carbon Electrode Material According to the Present Invention]

[II-1. Configuration of Second Carbon Electrode Material]

The inventors have made intensive studies to provide a carbon electrode material preferably used especially in a Mn—Ti redox flow battery using a Mn ion as a positive-electrode active material and a Ti ion as a negative-electrode active material. Unlike a conventional vanadium redox flow battery and Fe—Cr redox flow battery, it is important that a Mn—Ti redox flow battery has an oxidation resistance to Mn ions. However, this point has not been considered in the electrode materials proposed so far. It has been found from the results of studies by the inventors that it is difficult to achieve both oxidation resistance and low resistance when a conventional electrode material is used in a Mn—Ti redox flow battery.

In providing the above-mentioned carbon electrode material, the inventors first reviewed the requirements for particles exhibiting reactivity. In general, as particles exhibiting reaction activity in a redox flow battery, there can be exemplified known carbon particles such as carbon blacks such as acetylene black (acetylene soot), oil black (furnace black, oil soot), and gas black (gas soot); graphitized soot, carbon fiber powder, carbon nanotube (CNT), carbon nanofiber, carbon aerogel, mesoporous carbon, glassy carbon powder, activated carbon, graphene, graphene oxide, N-doped CNT, boron-doped CNT, fullerene, petroleum coke, acetylene coke, and anthracite coke. Among these, carbon particles with high reactivity, high specific surface area, and low crystallinity, such as carbon blacks, are easily oxidized against a charging solution of positive-electrode manganese and thus cannot be used. Furthermore, it was impossible to develop sufficient reaction activity by merely using particles with high crystallinity, such as carbon particles of CNT or the like. Furthermore, these materials are rare and expensive and thus not suitable for inexpensive electrode materials.

Consequently, the inventors focused on graphite particles as particles showing reactivity, and decided to adopt highly crystalline graphite particles satisfying the following requirements (1) and (2) as graphite particles (B).

(1) Particle diameter of 1 μm or more; and (2) When a crystallite size in the c-axis direction determined by X-ray diffraction in the graphite particles (B) is taken as Lc (B), Lc (B) is 35 nm or more.

It was found that when graphite particles satisfying these requirements are used, a carbon edge plane as a reaction field can be exposed neither too much nor too little, and compatibility between low resistance and high oxidation resistance can be achieved.

Furthermore, the inventors have decided to adopt a carbonaceous material having binding properties to bind both of the carbonaceous fibers (A) and the graphite particles (B), having high crystallinity, and satisfying the following requirements (3) and (4) as a carbonaceous material (C).

(3) When a crystallite size in the c-axis direction determined by X-ray diffraction is taken as Lc (C), Lc (C) is 10 nm or more.

(4) When a crystallite size in the c-axis direction determined by X-ray diffraction in the carbonaceous fibers is taken as Lc (A), Lc (C)/Lc (A) is 1.0 or more.

Here, "bind both of the carbonaceous fibers (A) and the graphite particles (B)" (in other words, the carbonaceous material used in the second electrode material acts as a binder for the carbonaceous fibers and the graphite particles)

means that the surfaces and insides of the carbonaceous fibers and the graphite particles (including between the carbonaceous fibers and among the graphite particles) are strongly bound by the carbonaceous material, and when seen as the entire electrode material, it is configured such that the surfaces of the graphite particles are exposed while the carbonaceous fibers are covered with the carbonaceous material.

However, it is preferable that the carbonaceous material after binding be not in a state of coating. Here, "not in a state of coating" means that the carbonaceous material (C) does not form a web state such as a totipalmate or palmate foot between the carbonaceous fibers (A). When the coating state is formed, the liquid permeability of the electrolyte deteriorates, and the reaction surface area of the graphite particles cannot be used effectively.

For reference, FIG. 3 shows an SEM photograph showing a state in which both the carbonaceous fibers (A) and the graphite particles (B) are bound in the second electrode material. FIG. 3 is an SEM photograph (magnification: 100 times) of No. 1 (an example of the present invention satisfying the requirements for the second electrode material) in Table 3A. As shown in FIG. 3, the surfaces and insides of the carbonaceous fibers (A) and the graphite particles (B) are strongly bound by the carbonaceous material (C), and the surfaces of the graphite particles (B) are exposed while the carbonaceous fibers (A) are covered with the carbonaceous material (C).

On the other hand, FIG. 4 shows an SEM photograph showing a state where both the carbonaceous fibers (A) and the graphite particles (B) are not bound in the second electrode material. FIG. 4 is an SEM photograph (magnification: 100 times) of No. 13 (a comparative example not satisfying the requirements for the second electrode material) in Table 3A in Example 3 described later.

In order to obtain such a binding state, the content ratio of the carbonaceous material relative to the total amount of the carbonaceous fibers, the graphite particles and the carbonaceous material is preferably increased, and is, for example, 20% or more in the second electrode material. In this respect, the carbonaceous material in the second electrode material differs from the carbonaceous material disclosed in the above-mentioned Patent Document 4. Patent Document 4 has only a perception that the carbonaceous material used may act as a localized adhesive under the concept that it is only necessary that only the portions of the carbonaceous fibers and the carbon fine particles that are originally in contact with each other may be fixed (bonded). Therefore, in the examples of Patent Document 4, the content of the carbonaceous material is at most 14.4%.

It was found that when the above carbonaceous material with binding properties is used, the carbonaceous material strongly binds the carbonaceous fibers and the like via the graphite particles, so that an efficient conduction path can be formed, the effects due to the addition of the graphite particles as described above are more effectively exhibited, and compatibility between low resistance and high oxidation resistance can be achieved.

Furthermore, it was found that, by using the highly crystalline carbonaceous material satisfying the above (3) and (4), not only a high oxidation resistance is provided to the carbonaceous material itself, but also the effect of protecting the carbonaceous fibers against oxidative degradation is enhanced. In Patent Document 4 described above, the above (3) is not considered at all, and it seems that a desired oxidation resistance cannot be obtained.

In addition, the second carbon electrode material satisfies the following requirement (5).

(5) The number of bound oxygen atoms onto the surface of the carbon electrode material is 1.0% or more of the total number of carbon atoms on the surface of the carbon electrode material.

This allows the introduction of oxygen atoms onto an edge plane or defect structure portions of carbon. As a result, on the surface of the electrode material, reactive groups such as a carbonyl group, a quinone group, a lactone group, and a free radical oxide are generated by the introduced oxygen atoms, and hence these reactive groups greatly contribute to the electrode reaction, whereby a sufficiently low resistance can be obtained.

The second electrode material is configured as described above, so that the reaction activity is enhanced while maintaining a high oxidation resistance, and an electrode that has a low resistance and a long lifetime can be obtained. In particular, when the second electrode material is used as an electrode material for an electrolytic cell of a positive-electrode manganese redox flow battery, it is possible to lower a cell resistance during initial charge and discharge and improve battery energy efficiency, and thus to provide a carbon electrode material with excellent oxidation resistance to a positive-electrode charging solution.

As described above, the second electrode material 5 is an electrode material in which the graphite particles (B) are supported on the carbonaceous fibers (A) as a base material by the highly crystalline carbonaceous material (C), and satisfies the above requirements (1) to (5). The details of each requirement are as follows.

[Carbonaceous Fibers (A)]

The carbonaceous fibers used in the second electrode material are obtained by subjecting an organic fiber precursor to a heat and carbonization treatment (details thereof will be described later) and contain carbon in a mass ratio of 90% or more (JIS L 0204-2). Examples of the organic fiber precursor used as a raw material of the carbonaceous fibers include acrylic fiber such as polyacrylonitrile; phenol fiber; PBO fiber such as polyparaphenylene benzobisoxazole (PBO); aromatic polyamide fiber; pitch fiber such as isotropic pitch, anisotropic pitch fiber, and mesophase pitch; and cellulose fiber. Among these, from the viewpoints of being excellent in oxidation resistance and being excellent in strength and elastic modulus, acrylic fiber, phenol fiber, cellulose fiber, isotropic pitch fiber, and anisotropic pitch fiber are preferable as the organic fiber precursor, and acrylic fiber is more preferable. Acrylic fiber is not particularly limited as long as it contains acrylonitrile as a main component. The content of acrylonitrile in a raw material monomer constituting acrylic fiber is preferably 95% by mass or more, and more preferably 98% by mass or more.

The mass average molecular weight of the organic fiber is not particularly limited, but is preferably 10000 or more and 100000 or less, more preferably 15000 or more and 80000 or less, and further preferably 20000 or more and 50000 or less. The mass average molecular weight can be measured by a method such as gel permeation chromatography (GPC), measuring a solution viscosity, or the like.

The average fiber diameter of the carbonaceous fibers is preferably 0.5 to 40 μm. If the average fiber diameter is smaller than 0.5 μm, the liquid permeability deteriorates. On the other hand, if the average fiber diameter is larger than 40 μm, the reaction surface area of the fiber portion decreases, and the cell resistance rises. Considering a balance between the liquid permeability and the reaction surface area, the average fiber diameter is more preferably 3 to 20 μm.

In the second electrode material, a structure composed of the above carbonaceous fibers is preferably used as a base material, whereby strength is improved, and handling and workability are facilitated. Specific examples of the structure include a sheet-like material of a spun yarn, a sheet-like material of a filament bundling yarn, a nonwoven fabric, a knitted fabric, a woven fabric, and a special knitted fabric described in Japanese Patent Publication No. S63-200467-A or the like that are made of carbonaceous fibers, and paper made of carbon fibers. Among these, a nonwoven fabric, a knitted fabric, a woven fabric, a special knitted fabric that are made of carbonaceous fiber, and paper made of carbon fiber are more preferable in terms of handling, workability, manufacturability, and the like.

When using a nonwoven fabric, a knitted fabric, a woven fabric, or the like, the average fiber length is preferably 30 to 100 mm. When using paper made of carbon fibers, the average fiber length is preferably 5 to 30 mm. By rendering the average fiber length within the above range, a uniform fiber structure can be obtained.

As described above, the carbonaceous fibers are obtained by subjecting an organic fiber precursor to a heat and carbonization treatment. Preferably, the above-mentioned "heat and carbonization treatment" includes at least a flameproofing step and a carbonization (firing) step. However, the carbonization step does not necessarily need to be performed after the flameproofing step as described above, and may be performed after the flameproofed fibers are impregnated with graphite particles and a carbonaceous material as described in the examples described later. In this case, a carbonization step after the flameproofing step can be omitted.

The flameproofing step means a step of heating an organic fiber precursor at a temperature of preferably 180° C. or higher and 350° C. or lower in an air atmosphere to obtain flameproofed organic fiber. The heat treatment temperature is more preferably 190° C. or higher, and further preferably 200° C. or higher. Moreover, the heat treatment temperature is more preferably 330° C. or lower, and further preferably 300° C. or lower. By heating in the above-mentioned temperature range, the contents of nitrogen and hydrogen in the organic fiber can be reduced while the form of carbonaceous fiber can be retained without the organic fiber being thermal decomposed, and the carbonization ratio can be improved. During the flameproofing step, since the organic fiber is thermally shrunk, the molecular orientation may be deteriorated, resulting in a reduced conductivity of the carbonaceous fibers. Therefore, the organic fiber is preferably subjected to the flameproofing treatment under tension or under stretching, and more preferably subjected to the flameproofing treatment under tension.

The carbonization step means a step of heating the flameproofed organic fiber obtained as described above, in an inert atmosphere (preferably in a nitrogen atmosphere), preferably at a temperature of 1000° C. or higher and 2000° C. or lower to obtain a carbonaceous fiber. The heating temperature is more preferably 1100° C. or higher, and further preferably 1200° C. or higher, and is more preferably 1900° C. or lower. By performing the carbonization step in the above-mentioned temperature range, carbonization of the organic fiber proceeds, and a carbonaceous fiber having a quasi-graphite crystal structure can be obtained.

Since different types of organic fibers have different crystallinities, the heating temperature in the carbonization step can be selected depending on the type of organic fiber used as a raw material.

For example, when using acrylic resin (preferably polyacrylonitrile) as organic fiber, the heating temperature is preferably 800° C. or higher and 2000° C. or lower, and more preferably 1000° C. or higher and 1800° C. or lower.

Preferably, the above-mentioned flameproofing step and carbonization step are performed continuously. The temperature rise rate when raising the temperature from the flameproofing temperature to the carbonization temperature is preferably 20° C./min or less, and more preferably 15° C./min or less. By rendering the temperature rise rate within the above range, it is possible to obtain a carbonaceous fiber that retains the shape of the organic fiber and has excellent mechanical properties. The lower limit of the temperature rise rate is preferably 5° C./min or more in consideration of mechanical properties and the like.

As described in detail in the section of carbonaceous material (C) described later, the second electrode material satisfies that, when crystallite sizes in the c-axis direction determined by X-ray diffraction in the carbonaceous fibers (A) and the carbonaceous material (C) are taken as Lc (A) and Lc (C), respectively, Lc (C)/Lc (A) is 1.0 or more, as specified in the above (4). Therefore, as long as the second electrode material satisfies the above (4), Lc (A) in the carbonaceous fibers (A) is not particularly limited, but is preferably 1 to 15 nm. Thus, effects such as appropriate electron conductivity, oxidation resistance to a sulfuric acid solvent and the like, and easy provision of an oxygen functional group are effectively exhibited. Lc (A) is more preferably 2 to 10 nm. The measurement method of Lc (A) will be described in detail in the section of Examples below.

[Graphite Particles (B)]

In the second electrode material, the graphite particles are necessary to increase a change in valence (reactivity) due to oxidation-reduction to obtain high oxidation resistance. Although a carbon edge plane, which is a reaction field, is necessary to develop high reactivity, excessive exposure of the edge plane causes a decrease in oxidation resistance. According to the results of studies by the inventors, it was found that when a crystallite size in the c-axis direction determined by X-ray diffraction in the graphite particles is taken as Lc (B), the value of Lc (B) correlates with the degree of exposure of the carbon edge plane. Specifically, as specified in the above (2), Lc (B) is 35 nm or more, and preferably 37 nm or more, whereby a carbon edge plane as a reaction field can be exposed neither too much nor too little, and compatibility between low resistance and high oxidation resistance can be achieved. The upper limit of the above value is not particularly limited from the above viewpoints, but is preferably about 50 nm or less in consideration of the balance between oxidation resistance and low resistance.

In general, graphite particles are roughly classified into natural graphite and artificial graphite. Examples of natural graphite include flake graphite, vein graphite, amorphous graphite, spherical graphite, and exfoliated graphite. Examples of artificial graphite include expanded graphite and graphite oxide. In the second electrode material, either of natural graphite and artificial graphite can be used. Among these, graphite oxide, flaky graphite, vein graphite, amorphous graphite, exfoliated graphite, and expanded graphite are preferable because they have carbon edge planes as a reaction field. Among these, flaky graphite, exfoliated graphite, and expanded graphite are more preferable because they have a very large degree of exposure of carbon edge plane, so that a low resistance can be achieved, and in addition, they are inexpensive and abundant resources. These flaky graphite, exfoliated graphite, and expanded graphite may be used singly or used in combination of two or more. Flaky graphite means graphite having a leaf-like appearance. Flaky graphite is different from vein graphite, which is massive and may be referred to as massive graphite.

As specified in the above (1), the graphite particles (B) used in the second electrode material have a particle diameter of 1 μm or more, preferably 3 μm or more. When the particle diameter is less than 1 μm, the ratio of portion buried in the carbonaceous material increases, and the graphite particles appears on the surface, though the amount is small. Therefore, the specific surface area of the carbonaceous material increases too much. As a result, the effect of improving the oxidation resistance due to the addition of the graphite particles (B) is not effectively exhibited, and the oxidation resistance tends to decrease.

The reason why the effect of improving the oxidation resistance is not effectively exhibited when the specific surface area of the carbonaceous material is increased is inferred as follows.

Normally, when the graphite particles are buried, it is expected that resistance will increase but durability will also increase by a trade-off. However, in reality, the results in high resistance and low durability are obtained. It can be inferred that the effect of the addition of the graphite particles is not effectively exhibited due to burial of the graphite particles, the resistance increases, and the specific surface area of the carbonaceous material is also increased by covering the graphite particles with the carbonaceous material (binder), resulting in a decrease in durability.

Here, the "particle diameter" means an average particle diameter (D50) at a median 50% diameter in a particle diameter distribution obtained by a dynamic light scattering method or the like. Commercially-available graphite particles may be used, in which case the particle diameters described in the catalog can be employed.

The graphite particles used in the second electrode material are preferably contained in a mass ratio of 20% or more, and more preferably 25% or more, relative to the total amount of the carbonaceous fibers (A) described above, the graphite particles (B), and the carbonaceous material (C) described later. As a result of this, the above-mentioned effects due to the addition of the graphite particles are effectively exhibited, and the oxidation resistance is especially improved. The upper limit of the content of the graphite particles is not particularly limited in respect of oxidation resistance and the like, but is preferably about 60% or less in consideration of the liquid permeability of the electrolyte. When a structure such as a nonwoven fabric or the like is used as a base material, the amount of the carbonaceous fibers (A) used for calculating the above content is the amount of this structure.

In the second electrode material, the mass ratio of the carbonaceous material (C) described later to the graphite particles (B) is preferably 0.2 or more and 3.0 or less, and more preferably 0.3 or more and 2.5 or less. When the above ratio is less than 0.2, the amount of coming-off graphite particles increases, and in particular, the effect of improving oxidation resistance due to the addition of the graphite particles is not effectively exhibited. On the other hand, when the above ratio exceeds 3.0, the carbon edge planes of the graphite particles, which are the reaction field, are covered, and a desired low resistance cannot be obtained.

The BET specific surface area determined from the adsorbed nitrogen amount of the graphite particles (B) used in the second electrode material is preferably from 3 to 20 $m^2/g$, and more preferably from 5 to 15 $m^2/g$. When the BET specific surface area is less than 3 $m^2/g$, the degree of exposure of the edge planes of the graphite particles (B) is reduced, so that a desired low resistance cannot be obtained. On the other hand, when the BET specific surface area exceeds 20 $m^2/g$, the specific surface area becomes too large, and the effect of improving oxidation resistance due to the addition of the graphite particles (B) is not effectively exhibited, and the oxidation resistance tends to decrease. The "BET specific surface area determined from the adsorbed nitrogen amount" means a specific surface area obtained by adsorbing gas molecules on solid particles and calculating from the amount of the adsorbed gas molecules.

[Carbonaceous Material (C)]

A carbonaceous material used in the second electrode material is added as a binding agent (binder) for strongly binding carbonaceous fibers and graphite particles, which cannot be intrinsically bound, and has a function of protecting the carbonaceous fibers with poor oxidation resistance. The second electrode material needs to satisfy that, when a crystallite size in the c-axis direction determined by X-ray diffraction in the carbonaceous material (C) is taken as Lc (C), Lc (C) is 10 nm or more, as specified in the above (3), and that, when a crystallite size in the c-axis direction determined by X-ray diffraction in the carbonaceous fibers (A) is taken as Lc (A), Lc (C)/Lc (A) is 1.0 or more, as specified in the above (4).

By using the carbonaceous material with binding properties satisfying all of these requirements, high oxidation resistance is provided to the carbonaceous material (C) itself. In addition, the carbonaceous fibers are covered with the highly crystalline carbonaceous material (C), and the effect of protecting the carbonaceous fibers against oxidative degradation is enhanced, whereby the oxidation resistance of the entire electrode material is also improved.

From the above viewpoints, Lc (C) is preferably 10 nm or more, and more preferably 12 nm or more. The upper limit of Lc (C) is not particularly limited from the above viewpoints, but is preferably about 40 nm or less in consideration of achieving compatibility between oxidation resistance and low resistance.

When the ratio of Lc (C)/Lc (A) is less than 1.0, the above-mentioned effects cannot be effectively exhibited. The above ratio is preferably 2 or more, and more preferably 3 or more. On the other hand, when the above ratio exceeds 10, it is difficult to achieve compatibility with low resistance. The above ratio is preferably 8 or less.

The carbonaceous material (C) used in the second electrode material is preferably contained in a mass ratio of 20% or more, and more preferably 30% or more, relative to the total amount of the carbonaceous fibers (A), the graphite particles (B), and the carbonaceous material (C) described above. By increasing the content of the carbonaceous material like this, both the carbonaceous fibers and the graphite particles can be sufficiently bound, and the above-mentioned effects due to the addition of the carbonaceous material are effectively exhibited, and the oxidation resistance is especially improved. The upper limit of the content of the carbonaceous material (C) is not particularly limited in respect of oxidation resistance and the like, but is preferably about 60% or less, and more preferably 50% or less in consideration of pressure drop in liquid permeation and the like.

The type of the carbonaceous material (C) used in the second electrode material may be any type capable of binding the carbonaceous fibers (A) and the graphite particles (B). Specifically, the material is not particularly limited as long as it exhibits the binding properties at the time of carbonization when producing the second electrode material. Examples of such a material include pitch materials such as coal-tar pitch and coal pitch; resins such as phenol resin, benzoxazine resin, epoxide resin, furan resin, vinyl ester resin, melanine-formaldehyde resin, urea-formaldehyde resin, resorcinol-formaldehyde resin, cyanate ester resin, bismaleimide resin, polyurethane resin, and polyacrylonitrile resin; furfuryl alcohol; rubbers such as acrylonitrile-butadiene rubber. Commercially-available products may be used for these materials.

Among these, pitch materials such as coal-tar pitch and coal pitch, which are particularly easier to crystallize, are preferably used because a desired carbonaceous material (C) can be obtained at a low firing temperature. Polyacrylonitrile resin is also preferably used because a desired carbonaceous material (C) can be obtained by raising a firing temperature. Pitch materials are particularly preferable.

In a preferred embodiment of the second electrode material, since no phenol resin is used, no adverse effects (generation of formaldehyde and a formaldehyde odor at room temperature) associated with the use of phenol resin occur, and there are advantages such as no odor at normal temperature. On the other hand, in Patent Document 4 described above, phenol resin is used as an adhesive, and therefore, in addition to the above adverse effects, there are disadvantages in respect of cost and workability, such as the necessity of a separate facility for controlling a formaldehyde concentration in a work place to be below a managed concentration.

Here, a particularly preferred pitch material will be described in detail. In the coal-tar pitch or the coal pitch described above, the content of a mesophase phase (liquid-crystalline phase) can be controlled by the temperature and the time of infusibilization treatment. If the content of the mesophase phase is low, a pitch material that melts at a relatively low temperature or that is in a liquid state at room temperature is obtained. On the other hand, if the content of the mesophase phase is high, a pitch material that melts at a high temperature and that has a high carbonization yield is obtained. When a pitch material is applied to the carbonaceous material (C), a pitch material having a high content of a mesophase phase (that is, having a high carbonization yield) is preferably used, and, for example, the content is preferably 30% or more, and more preferably 50% or more. As a result, the fluidity of the pitch material when melted can be suppressed, and the carbonaceous fibers can be bound via the graphite particles without excessively covering the surfaces of the graphite particles. The upper limit of the content is preferably, for example, 90% or less in consideration of the development of binding properties and the like.

From the same viewpoint as above, the melting point of the pitch material is preferably 100° C. or higher, and more preferably 200° C. or higher, whereby the above effects can be obtained, and in addition, odors generated during the impregnation processing can be suppressed, which is preferable in terms of workability. The upper limit of the melting point is preferably, for example, 350° C. or lower in consideration of the development of binding properties and the like.

[II-2. Characteristics of Second Carbon Electrode Material]

The second electrode material satisfies that the number of bound oxygen atoms onto the surface of the carbon electrode material is 1.0% or more of the total number of carbon atoms on the surface of the carbon electrode material. Hereinafter, the ratio of the number of bound oxygen atoms to the total number of carbon atoms may be abbreviated as 0/C. The O/C can be measured by surface analysis such as X-ray photoelectron spectroscopy (XPS) or X-ray fluorescence analysis.

When an electrode material having an O/C of 1.0% or more is used, the electrode reaction rate can be remarkably increased, and a low resistance can be realized. The hydrophilicity is also increased by controlling the O/C, and the water passing rate (preferably 0.5 mm/sec or more) of the electrode material described later can be ensured. On the other hand, when an electrode material having a low oxygen concentration with an O/C of less than 1.0% is used, the electrode reaction rate during discharge decreases, and the electrode reaction activity cannot be increased. As a result, the resistance increases. Although the details on the reason are not clear why the electrode reaction activity (in other words, voltage efficiency) is increased by the use of an electrode material having a large number of bound oxygen atoms onto the surface of the electrode material, it is considered that a large number of oxygen atoms present on the surface effectively act on the affinity between the carbonaceous material (C) and the electrolyte, transfer of electrons, desorption of complex ions from a carbonaceous material, and complex exchange reaction, and the like.

The second electrode material is excellent in hydrophilicity. The hydrophilicity can be confirmed by a water passing rate when a water droplet is dropped on the electrode material after the dry oxidation treatment. The water passing rate of the second electrode material is preferably 0.5 mm/sec or more. From this water passing rate, it can be determined to have a sufficient hydrophilicity for the electrolyte. The higher the water passing rate of the electrode material, the better, and the water passing rate of the electrode material is more preferably 1 mm/sec or more, further preferably 5 mm/sec or more, and still further preferably 10 mm/sec or more.

When the thickness of the spacer 2 sandwiched between the collector plate 1 and the ion exchange membrane 3 (hereinafter, referred to as "spacer thickness") is 0.3 to 3 mm, the basis weight of the second electrode material is preferably 50 to 500 g/m$^2$, and more preferably 100 to 400 g/m$^2$. By controlling the basis weight to be in the above range, the ion exchange membrane 3 can be prevented from being damaged while ensuring liquid permeability. In recent years, from the viewpoint of lowering the resistance, the thickness of the ion-exchange membrane 3 tends to decrease, and a treatment and a use method for reducing a damage to the ion exchange membrane 3 are extremely important. From the above viewpoint, it is more preferable to use, in the second electrode material, a nonwoven fabric or paper having one surface flattened as a base material. As a flattening method, any known method can be used, and examples thereof include a method in which a slurry is applied to one surface of carbonaceous fiber and dried; and a method in which impregnating and drying are performed on a smooth film such as PET.

The thickness of the second electrode material is preferably at least larger than the spacer thickness. For example, when a low-density material such as a nonwoven fabric is used as the carbonaceous fibers, and the graphite particles and the carbonaceous material with binding properties used in the second electrode material are supported on the carbonaceous fibers, the thickness of the second electrode material is preferably 1.5 to 6.0 times the spacer thickness. However, if the thickness of the second electrode material is too large, it may break through the ion-exchange membrane 3 due to the compressive stress of the sheet-like material. For this reason, it is preferable to use the second electrode material having a compressive stress of 9.8 N/cm² or less. In order to adjust the compressive stress and the like according to the basis weight and thickness of the second electrode material, the second electrode material may be used in a laminated state of two layers, three layers, or the like. It is also possible to combine the second electrode material with an electrode material in another form.

The BET specific surface area determined from the adsorbed nitrogen amount of the second electrode material is preferably 1.0 to 8 m²/g, and more preferably 1.5 to 6 m²/g. When the BET specific surface area is less than 1.0 m²/g, the degree of exposure of the edge planes of the graphite particles (B) is reduced, so that a desired low resistance cannot be obtained. On the other hand, when the BET specific surface area exceeds 8 m²/g, the specific surface area becomes too large, and the effect of improving oxidation resistance due to the addition of the graphite particles (B) is not effectively exhibited, and the oxidation resistance tends to decrease.

[II-3. Method for Producing Second Carbon Electrode Material]

Next, a method of producing the second electrode material will be described. The second electrode material can be produced by impregnating carbonaceous fibers (base material) with graphite particles and a carbonaceous material precursor (before being carbonized), and then letting the carbonaceous fibers go through a carbonization step, a graphitization step, and an oxidation treatment step. In each step, any known method can be used.

Hereinafter, each step will be described.

(Step of Impregnating Carbonaceous Fibers with Graphite Particles and Carbonaceous Material Precursor)

First, carbonaceous fibers are impregnated with graphite particles and a carbonaceous material precursor. For impregnating the carbonaceous fibers with the graphite particles and the carbonaceous material precursor, any known method can be adopted. For example, there can be mentioned a method in which the above carbonaceous material precursor is heated and melted, graphite particles are dispersed in the obtained melt, and the carbonaceous fibers are immersed in the melt dispersion and then cooled to room temperature. Alternatively, as shown in the examples described later, a method can be used in which the above carbonaceous material precursor and the graphite particles are dispersed in a solvent such as water or alcohol to which a binder (temporary adhesive) that disappears during carbonization, such as polyvinyl alcohol, is added, and the carbonaceous fibers are immersed in this dispersion liquid, and then dried by heating. Excess liquid of the above-mentioned melt dispersion or dispersion liquid with which the carbonaceous fibers are immersed can be removed, for example, by passing it through a nip roller with a predetermined clearance to squeeze excess dispersion liquid contained when immersed in the dispersion liquid, or by using a doctor blade or the like to scrape excess dispersion liquid attached on the surface when immersed in the dispersion liquid.

Thereafter, drying is performed at, for example, 80 to 150° C. in an air atmosphere.

(Carbonization Step)

The carbonization step is performed in order to fire the product after being impregnated obtained in the above step, thereby binding the carbonaceous fibers via the graphite particles. In the carbonization step, it is preferable to sufficiently remove a decomposition gas generated during carbonization. For example, heating is preferably performed at a temperature of 800° C. or higher and 2000° C. or lower in an inert atmosphere (preferably, in a nitrogen atmosphere).

The heating temperature is more preferably 1000° C. or higher, further preferably 1200° C. or higher, and still further preferably 1300° C. or higher, and is more preferably 1500° C. or lower, and further preferably 1400° C. or lower.

As described above, a treatment corresponding to the carbonization step may be performed also after flameproofing of the fiber, and the carbonization treatment after flameproofing of the fiber may be omitted. That is, a method for producing the second electrode material is broadly divided into the following methods 1 and 2.

Method 1: flameproofing of fiber→carbonization of fiber→impregnation with graphite particles and carbonaceous material→carbonization→graphitization→oxidation Method 2: flameproofing of fiber→impregnation with graphite particles and carbonaceous material→carbonization→graphitization→oxidation According to the above method 1, although the processing cost increases because the carbonization is performed twice, a sheet used as the electrode material is hardly affected by a difference in volume shrinkage ratio, and thus, there is an advantage that the obtained sheet is unlikely to deform (warp). On the other hand, according to the above method 2, the carbonization step may be performed only once, so that the processing cost can be reduced. However, the sheet obtained tends to deform due to a difference in volume shrinkage ratio at the time of carbonization of each material. The choice as to which of the above methods 1 and 2 should be adopted may be appropriately made in consideration of the above points.

(Graphitization Step)

The graphitization step is performed in order to sufficiently increase the crystallinity of the carbonaceous material and develop a high oxidation resistance. After the carbonization step, it is preferable to further perform heating in an inert atmosphere (preferably in a nitrogen atmosphere) at a temperature that is 1800° C. or higher and that is higher than the heating temperature in the carbonization step, and more preferably 2000° C. or higher. The upper limit of the heating temperature in the graphitization step is preferably 3000° C. or lower in consideration of a load applied to equipment and the like.

Patent Document 4 described above differs from the method for producing the second electrode material in that the graphitization step is not performed. Therefore, the electrode material of Patent Document 4 does not satisfy the requirements for the second electrode material (Lc of the carbonaceous material (C) is 10 nm or more).

(Oxidation Treatment Step)

After the graphitization step, an oxidation treatment step is further performed, so that an oxygen-functional group such as a hydroxyl group, a carbonyl group, a quinone group, a lactone group, and a free-radical oxide is introduced to the surface of the electrode material. As a result, the above-mentioned O/C ratio≥1% can be achieved. Since these oxygen-functional groups greatly contribute to the electrode reaction, a sufficiently low resistance can be obtained. In addition, the water passing rate can be increased.

As the oxidation treatment step, various treatment steps such as wet chemical oxidation, electrolytic oxidation, and dry oxidation can be used, and a dry oxidation treatment step is preferred from the viewpoints of workability and production costs. The dry oxidation treatment step means a step of heating (oxidizing treatment) in an air atmosphere, for example, at 500° C. or higher and 900° C. or lower. In order to effectively exert the effect of the introduction of the oxygen-functional group, the heating temperature is more preferably 600° C. or higher, and further preferably 650° C. or higher. In addition, the heating temperature is more preferably 800° C. or lower, and further preferably 750° C. or lower.

Furthermore, in the dry oxidation treatment step, it is preferable to adjust a mass yield of the electrode material before and after the oxidation treatment to 90% or more and 96% or less from the viewpoint of maintaining the mechanical strength of the electrode material. The mass yield can be adjusted by a method such as appropriately adjusting a treatment time and temperature of dry air oxidation.

[III. Third Carbon Electrode Material According to the Present Invention]

[III-1. Configuration of Third Carbon Electrode Material]

The inventors have made studies by using carbon particles other than graphite particles in providing a carbon electrode material with lowered cell resistance during initial charge and discharge. As a result, it was found that, when carbon particles with a small particle diameter and low crystallinity are used, the reaction surface area increases, an oxygen functional group is easily provided, the reaction activity increases, and a low resistance is obtained.

Specifically, in the third carbon electrode material, carbon particles satisfying the following requirements (1) and (2) are adopted as carbon particles other than graphite particles.

(1) Carbon particles (B) other than graphite particles have a particle diameter of 1 μm or less.

(2) When a crystallite size in the c-axis direction determined by X-ray diffraction in the carbon particles (B) other than graphite particles is taken as Lc (B), Lc (B) is 10 nm or less.

When the carbon particles having a small particle diameter like the above (1) are used, the reaction surface area increases, so that the resistance can be lowered. Furthermore, an oxygen functional group can be easily introduced into low crystalline carbon particles like the above (2), thereby improving the reaction activity, so that the resistance can be further lowered.

Furthermore, in the third carbon electrode material, a carbonaceous material with binding properties to bind both of the carbonaceous fibers (A) and the carbon particles (B) other than graphite particles is used as a carbonaceous material (C). The carbonaceous material (C) satisfies the following requirement (3), has a higher crystallinity than the crystallinity of the carbonaceous fibers (A), and is used within the range of the following (4).

(3) When crystallite sizes in the c-axis direction determined by X-ray diffraction in the carbonaceous fibers (A) and the carbonaceous material (C) are taken as Lc (A) and Lc (C), respectively, Lc (C)/Lc (A) is 1.0 to 5.

(4) The carbonaceous material (C) is contained in a mass ratio of 14.5% or more relative to the total amount of the carbonaceous fibers (A), the carbon particles (B) other than graphite particles, and the carbonaceous material (C).

Here, "bind both of the carbonaceous fibers (A) and the carbon particles (B) other than graphite particles (in other words, the carbonaceous material used in the third electrode material acts as a binder for the carbonaceous fibers and the carbon particles other than graphite particles) means that the surfaces and insides of the carbonaceous fibers and the carbon particles other than graphite particles (including between the carbonaceous fibers and among the carbon particles other than graphite particles) are strongly bound by the carbonaceous material, and when seen as the entire electrode material, it is configured such that the surfaces of the carbon particles other than graphite particles are exposed while the carbonaceous fibers are covered with the carbonaceous material.

However, it is preferable that the carbonaceous material after binding be not in a state of coating. Here, "not in a state of coating" means that the carbonaceous material (C) does not form a web state such as a totipalmate or palmate foot between the carbonaceous fibers (A). When the coating state is formed, the liquid permeability of the electrolyte deteriorates, and the reaction surface area of the graphite particles cannot be used effectively.

Here, the difference from the above-mentioned Patent Document 4 will be described. The carbonaceous material strongly binds the carbonaceous fibers and the like via the carbon particles other than graphite particles, so that an efficient conduction path of the carbon particles and the carbonaceous fibers can be formed. For forming the conduction path, it is necessary to increase the content of the carbonaceous material relative to the total amount of the carbonaceous fibers, the carbon particles other than graphite particles, and the carbonaceous material. Therefore, the content of the carbonaceous material is set to 14.5% or more in the third carbon electrode material. On the other hand, in the examples of Patent Document 4 described above, the content of the carbonaceous material is at most 14.4%, which is smaller than the content of the carbonaceous material in the third carbon electrode material. In this respect, both of them are different. Patent Document 4 has only a perception that the carbonaceous material used may act as a localized adhesive under the concept that it is only necessary that only the portions of the carbonaceous fibers and the carbon fine particles that are originally in contact with each other may be fixed (bonded). In addition, Patent Document 4 does not specifically state the crystallinity of the carbonaceous material for binding. However, when a carbonaceous material with high crystallinity with respect to the carbonaceous fibers is used as in the third electrode material in order to form an excellent conduction path, the electron conductivity increases, resulting in more efficient electron transfer.

In addition, the third carbon electrode material satisfies the following requirement (5).

(5) The number of bound oxygen atoms onto the surface of the carbon electrode material is 1% or more of the total number of carbon atoms on the surface of the carbon electrode material.

This allows the introduction of oxygen atoms onto an edge plane or defect structure portions of carbon. As a result, on the surface of the electrode material, reactive groups such as a carbonyl group, a quinone group, a lactone group, and a free radical oxide are generated by the introduced oxygen atoms, and hence these reactive groups greatly contribute to the electrode reaction, whereby a sufficiently low resistance can be obtained.

The third electrode material is configured as described above, so that the reaction activity is enhanced, and an electrode that has a low resistance and is inexpensive can be obtained.

As described above, the third electrode material 5 is an electrode material in which the carbon particles (B) other than graphite particles are supported on the carbonaceous fibers (A) as a base material by the highly crystalline carbonaceous material (C), and satisfies the above requirements (1) to (5). The details of each requirement are as follows.

[Carbonaceous Fiber (A)]

The carbonaceous fibers used in the third electrode material are obtained by subjecting an organic fiber precursor to a heat and carbonization treatment (details thereof will be described later) and contain carbon in a mass ratio of 90% or more (JIS L 0204-2). Examples of the organic fiber precursor used as a raw material of the carbonaceous fibers include acrylic fiber such as polyacrylonitrile; phenol fiber; PBO fiber such as polyparaphenylene benzobisoxazole (PBO); aromatic polyamide fiber; pitch fiber such as isotropic pitch fiber, anisotropic pitch fiber, and mesophase pitch; and cellulose fiber. Among these, from the viewpoint of being excellent in strength and elastic modulus, acrylic fiber, phenol fiber, cellulose fiber, isotropic pitch fiber, and anisotropic pitch fiber are preferable as the organic fiber precursor, and acrylic fiber is more preferable. Acrylic fiber is not particularly limited as long as it contains acrylonitrile as a main component. The content of acrylonitrile in a raw material monomer constituting the acrylic fiber is preferably 95% by mass or more, and more preferably 98% by mass or more.

The mass average molecular weight of the organic fiber is not particularly limited, but is preferably 10000 or more and 100000 or less, more preferably 15000 or more and 80000 or less, and further preferably 20000 or more and 50000 or less. The mass average molecular weight can be measured by a method such as gel permeation chromatography (GPC), measuring a solution viscosity, or the like.

The average fiber diameter of the carbonaceous fibers is preferably 0.5 to 40 µm. If the average fiber diameter is smaller than 0.5 µm, the liquid permeability deteriorates. On the other hand, if the average fiber diameter is larger than 40 µm, the reaction surface area of the fiber portion decreases, and the cell resistance rises. Considering a balance between the liquid permeability and the reaction surface area, the average fiber diameter is more preferably 3 to 20 µm.

In the third electrode material, a structure composed of the above carbonaceous fiber is preferably used as a base material, whereby strength is improved, and handling and workability are facilitated. Specific examples of the structure include a sheet-like material of a spun yarn, a sheet-like material of a filament bundling yarn, a nonwoven fabric, a knitted fabric, a woven fabric, and a special knitted fabric described in Japanese Patent Publication No. S63-200467-A or the like that are made of carbonaceous fibers, and paper made of carbon fibers. Among these, a nonwoven fabric, a knitted fabric, a woven fabric, a special knitted fabric that are made of carbonaceous fibers, and paper made of carbon fibers are more preferable in terms of handling, workability, manufacturability, and the like.

When using a nonwoven fabric, a knitted fabric, a woven fabric, or the like, the average fiber length is preferably 30 to 100 mm. When using paper made of carbon fibers, the average fiber length is preferably 5 to 30 mm. By rendering the average fiber length within the above range, a uniform fiber structure can be obtained.

As described above, the carbonaceous fibers are obtained by subjecting an organic fiber precursor to a heat and carbonization treatment. Preferably, the above-mentioned "heat and carbonization treatment" includes at least a flameproofing step and a carbonization (firing) step. However, the carbonization step does not necessarily need to be performed after the flameproofing step as described above, and may be performed after the flameproofed fibers are impregnated with graphite particles and a carbonaceous material as described in the examples described later. In this case, a carbonization step after the flameproofing step can be omitted.

The flameproofing step means a step of heating an organic fiber precursor at a temperature of preferably 180° C. or higher and 350° C. or lower in an air atmosphere to obtain flameproofed organic fiber. The heat treatment temperature is more preferably 190° C. or higher, and further preferably 200° C. or higher. Moreover, the heat treatment temperature is more preferably 330° C. or lower, and further preferably 300° C. or lower. By heating in the above-mentioned temperature range, the contents of nitrogen and hydrogen in the organic fiber can be reduced while the form of carbonaceous fiber can be retained without the organic fiber being thermal decomposed, and the carbonization ratio can be improved. During the flameproofing step, since the organic fiber is thermally shrunk, the molecular orientation may be deteriorated, resulting in a reduced conductivity of the carbonaceous fibers. Therefore, the organic fiber is preferably subjected to the flameproofing treatment under tension or under stretching, and more preferably subjected to the flameproofing treatment under tension.

The carbonization step means a step of heating the flameproofed organic fiber obtained as described above, in an inert atmosphere (preferably in a nitrogen atmosphere), preferably at a temperature of 1000° C. or higher and 2000° C. or lower to obtain a carbonaceous fiber. The heating temperature is more preferably 1100° C. or higher, and further preferably 1200° C. or higher, and is more preferably 1900° C. or lower. By performing the carbonization step in the above-mentioned temperature range, carbonization of the organic fiber proceeds, and a carbonaceous fiber having a quasi-graphite crystal structure can be obtained.

Since different types of organic fibers have different crystallinities, the heating temperature in the carbonization step can be selected depending on the type of organic fiber used as a raw material.

For example, when using acrylic resin (preferably polyacrylonitrile) as organic fiber, the heating temperature is preferably 800° C. or higher and 2000° C. or lower, and more preferably 1000° C. or higher and 1800° C. or lower.

Preferably, the above-mentioned flameproofing step and carbonization step are performed continuously. The temperature rise rate when raising the temperature from the flameproofing temperature to the carbonization temperature is preferably 20° C./min or less, and more preferably 15°/min or less. By rendering the temperature rise rate within the above range, it is possible to obtain a carbonaceous fiber that retains the shape of the organic fiber and has excellent mechanical properties. The lower limit of the temperature rise rate is preferably 5° C./min or more in consideration of mechanical properties and the like.

As described in detail in the section of carbonaceous material (C) described later, the third electrode material satisfies that, when crystallite sizes in the c-axis direction determined by X-ray diffraction in the carbonaceous fibers (A) and the carbonaceous material (C) are taken as Lc (A) and 1. (C), respectively, Lc (C)/Lc (A) is 1.0 to 5, as specified in the above (3). Therefore, as long as the third electrode material satisfies the above (3), Lc (A) in the carbonaceous fibers (A) is not particularly limited, but is preferably 1 to 6 nm. Thus, effects such as appropriate electron conductivity, oxidation resistance to a sulfuric acid solvent and the like, and easy provision of an oxygen functional group are effectively exhibited. The measurement methods of Lc (A) and Lc (C) will be described in detail in the section of Examples below.

[Carbon Particles (B) Other than Graphite Particles]

In the third electrode material, "carbon particles other than graphite particles" are useful for increasing a reaction surface area and achieving a low resistance. In the third electrode material, "carbon particles other than graphite particles" satisfying the above (1) and (2) were used to lower the resistance.

First, the "carbon particles other than graphite particles" used in the third electrode material have a particle diameter of 1 µm or less as specified in the above (1), and preferably 0.5 µm or less. When the particle diameter exceeds 1 µm, the reaction surface area decreases and the resistance increases. Here, the "particle diameter" means an average particle diameter (D50) at a median 50% diameter in a particle diameter distribution obtained by a dynamic light scattering method or the like. For carbon particles other than graphite particles, commercially-available products may be used, in which case the particle diameter described in the catalog can be employed. A preferred lower limit of the particle diameter is 0.005 µm or more.

The BET specific surface area determined from the adsorbed nitrogen amount of the "carbon particles other than graphite particles" used in the third electrode material is preferably 20 $m^2$/g or more, more preferably 30 $m^2$/g or more, and further preferably 40 $m^2$/g or more. When the BET specific surface area is less than 20 $m^2$/g, the degree of exposure of the edge planes of the carbon particles is reduced, and a contact area with the electrolyte is also reduced, so that a desired low resistance cannot be obtained. The upper limit of the BET specific surface area is not particularly limited from the above viewpoint, but in consideration of the fact that bulky particles having a large surface area tend to increase the viscosity of a dispersion solution, so that the processability into a sheet or the like deteriorates, the upper limit of the BET specific surface area is generally preferably 2000 $m^2$/g or less. The "BET specific surface area determined from the adsorbed nitrogen amount" means a specific surface area obtained by adsorbing nitrogen molecules on solid particles and calculating from the amount of the adsorbed gas molecules.

Lc (B) in the "carbon particles other than graphite particles" used in the third electrode material is 10 nm or less as specified in the above (2). Since the use of highly crystalline carbon particles having Lc (B) exceeding 10 nm makes it difficult to introduce an oxygen functional group, the affinity in the vicinity of the carbon particles for the aqueous electrolyte decreases, the reaction activity decreases, and the resistance increases. Lc (B) is preferably 6 nm or less. The lower limit of Lc (B) is not particularly limited from the above viewpoint, but is preferably about 0.5 nm or more in consideration of oxidation resistance to an electrolytic solution and the like. The measurement methods of Lc (B) and La (B) will be described in detail in the section of Examples below.

As the "carbon particles other than graphite particles" used in the third electrode material, carbon particles with high reactivity, high specific surface area, and low crystallinity, such as carbon blacks such as acetylene black (acetylene soot), oil black (furnace black, oil soot), Ketjenblack, and gas black (gas soot), are often used. In addition to the above, carbon nanotube (CNT), carbon nanofiber, carbon aerogel, mesoporous carbon, graphene, graphene oxide, N-doped CNT, boron-doped CNT, fullerene, and the like can be mentioned. Carbon blacks are preferably used from the viewpoints of prices of raw materials and the like.

The "carbon particles other than graphite particles" used in the third electrode material is preferably contained in a mass ratio of 5% or more, and more preferably 10% or more, relative to the total amount of the carbonaceous fibers (A) described above, the carbon particles (B) other than graphite particles, and the carbonaceous material (C) described later. As a result, the carbon particles other than graphite particles are bound by the carbonaceous material, and the resistance is lowered. However, when the amount of the carbon particles (B) other than graphite particles is excessively large, the binding properties of the carbonaceous material become insufficient and the particles come off. In addition, the liquid permeability deteriorates due to the improvement of a filling density, so that a desired low resistance cannot be obtained. Therefore, the upper limit of the content of the carbon particles other than graphite particles is preferably about 90% or less. When a structure such as a nonwoven fabric or the like is used as a base material, the amount of the carbonaceous fibers (A) used for calculating the above content is the amount of this structure.

In the third electrode material, the mass ratio of the carbonaceous material (C) described later to the carbon particles (B) other than graphite particles is preferably 0.2 or more and 10 or less, and more preferably 0.3 or more and 7 or less. When the above ratio is less than 0.2, the amount of coming-off carbon particles other than graphite particles increases, and the carbon particles are not sufficiently bound to the carbonaceous material. On the other hand, when the above ratio exceeds 10, the carbon edge planes of the carbon particles, which are the reaction field, are covered, and a desired low resistance cannot be obtained.

[Carbonaceous Material (C)]

A carbonaceous material used in the third electrode material is added as a binding agent (binder) for strongly binding carbonaceous fibers and carbon particles other than graphite particles, which cannot be intrinsically bound. The third electrode material needs to satisfy that, when crystallite sizes in the c-axis direction determined by X-ray diffraction in the carbonaceous fibers (A) and the carbonaceous material (C) are taken as Lc (A) and Lc (C), respectively, Lc (C)/L (A) is 1.0 to 5, as specified in the above (3).

By using the carbonaceous material with binding properties and a higher crystallinity than the crystallinity of the carbonaceous fibers (A), the electronic conduction resistance between the carbon particles (B) and the carbonaceous fibers (A) is lowered, and a smooth electronic conduction path between the carbon particles (B) and the carbonaceous fibers (A) can be formed. It was found that the carbonaceous material strongly binds the carbonaceous fibers and the like via the carbon particles other than graphite particles, so that an efficient conduction path can be formed, and the action of lowering the resistance due to the addition of the carbon particles other than graphite particles as described above are more effectively exhibited.

When the ratio of Lc (C)/Lc (A) is less than 1.0, the above-mentioned effects cannot be effectively exhibited. The above ratio is preferably 1.5 or more, and more preferably 3.0 or more. On the other hand, when the above ratio exceeds 5, it is hard to provide an oxygen functional group to the carbonaceous material portion. The above ratio is preferably 4.5 or less, and more preferably 4.0 or less.

In the third electrode material, the range of Lc (C) is not particularly limited as long as the ratio of Lc (C)/Lc (A) satisfies the above range. However, from the viewpoint of further lowering the resistance, Lc (C) is preferably 10 nm or less, and more preferably 7.5 nm or less. The lower limit of Lc (C) is not particularly limited from the above viewpoint, but is preferably about 3 nm or more in consideration of electron conductivity and the like.

The carbonaceous material (C) used in the third electrode material is contained in a mass ratio of 14.5% or more, preferably 15% or more, and more preferably 17% or more, relative to the total amount of the carbonaceous fibers (A), the carbon particles (B) other than graphite particles, and the carbonaceous material (C) described above. By increasing the content of the carbonaceous material like this, both the carbonaceous fibers and the carbon particles (B) other than graphite particles can be sufficiently bound, and the binding action due to the addition of the carbonaceous material are effectively exhibited. The upper limit of the content of the carbonaceous material (C) is preferably about 90% or less in consideration of liquid permeability of an electrolyte and the like.

The type of the carbonaceous material (C) used in the third electrode material may be any type capable of binding the carbonaceous fibers (A) and the carbon particles (B) other than graphite particles. Specifically, the material is not particularly limited as long as it exhibits the binding properties at the time of carbonization when producing the third electrode material. Examples of such a material include pitch materials such as coal-tar pitch and coal pitch; resins such as phenol resin, benzoxazine resin, epoxide resin, furan resin, vinyl ester resin, melanine-formaldehyde resin, urea-formaldehyde resin, resorcinol-formaldehyde resin, cyanate ester resin, bismaleimide resin, polyurethane resin, and polyacrylonitrile resin; furfuryl alcohol; rubbers such as acrylonitrile-butadiene rubber. Commercially-available products may be used for these materials.

Among these, pitch materials such as coal-tar pitch and coal pitch, which are particularly easier to crystallize, are preferably used because a desired carbonaceous material (C) can be obtained at a low firing temperature. Phenol resin is also preferably used because of having little change in crystallinity depending on a firing temperature and easier control of crystallinity. In addition, polyacrylonitrile resin is also preferably used because a desired carbonaceous material (C) can be obtained by raising a firing temperature. Pitch materials are particularly preferable.

In a preferred embodiment of the third electrode material, since no phenol resin is used, no adverse effects (generation of formaldehyde and a formaldehyde odor at room temperature) associated with the use of phenol resin occur, and there are advantages such as no odor at normal temperature. On the other hand, in Patent Document 4 described above, phenol resin is used as an adhesive, and therefore, in addition to the above adverse effects, there are disadvantages in respect of cost and workability, such as the necessity of a separate facility for controlling a formaldehyde concentration in a work place to be below a managed concentration.

Here, a particularly preferred pitch material will be described in detail. In the coal-tar pitch or the coal pitch described above, the content of a mesophase phase (liquid-crystalline phase) can be controlled by the temperature and the time of infusibilization treatment. If the content of the mesophase phase is low, a pitch material that melts at a relatively low temperature or that is in a liquid state at room temperature is obtained. On the other hand, if the content of the mesophase phase is high, a pitch material that melts at a high temperature and that has a high carbonization yield is obtained. When a pitch material is applied to the carbonaceous material (C), a pitch material having a high content of a mesophase phase (that is, having a high carbonization yield) is preferably used, and, for example, the content is preferably 30% or more, and more preferably 50% or more. As a result, the fluidity of the pitch material when melted can be suppressed, and the carbonaceous fibers can be bound via the carbon particles other than graphite particles without excessively covering the surfaces of the carbon particles other than graphite particles. The upper limit of the content is preferably, for example, 90% or less in consideration of the development of binding properties and the like.

From the same viewpoint as above, the melting point of the pitch material is preferably 100° C. or higher, and more preferably 200° C. or higher, whereby the above effects can be obtained, and in addition, odors generated during the impregnation processing can be suppressed, which is preferable in terms of workability. The upper limit of the melting point is preferably, for example, 350° C. or lower in consideration of the development of binding properties and the like.

[III-2. Characteristics of Third Carbon Electrode Material]

The third electrode material satisfies that the number of bound oxygen atoms onto the surface of the carbon electrode material is 1% or more of the total number of carbon atoms on the surface of the carbon electrode material. Hereinafter, the ratio of the number of bound oxygen atoms to the total number of carbon atoms may be abbreviated as O/C. The O/C can be measured by surface analysis such as X-ray photoelectron spectroscopy (XPS) or X-ray fluorescence analysis.

When an electrode material having an O/C of 1% or more is used, the electrode reaction rate can be remarkably increased, and a low resistance can be realized. The hydrophilicity is also increased by controlling the O/C, and the water passing rate (preferably 0.5 mm/sec or more) of the electrode material described later can be ensured. On the other hand, when an electrode material having a low oxygen concentration with an O/C of less than 1% is used, the electrode reaction rate during discharge decreases, and the electrode reaction activity cannot be increased. As a result, the resistance increases. Although the details on the reason are not clear why the electrode reaction activity (in other words, voltage efficiency) is increased by the use of an electrode material having a large number of bound oxygen atoms onto the surface of the electrode material, it is considered that a large number of oxygen atoms present on the surface effectively act on the affinity between the carbonaceous material (C) and the electrolyte, transfer of electrons, desorption of complex ions from a carbonaceous material, and complex exchange reaction, and the like.

The third electrode material is excellent in hydrophilicity. The hydrophilicity can be confirmed by a water passing rate when a water droplet is dropped on the electrode material after the dry oxidation treatment. The water passing rate of the third electrode material is preferably 0.5 mm/sec or more. From this water passing rate, it can be determined to have a sufficient hydrophilicity for the electrolyte. The higher the water passing rate of the electrode material, the better, and the water passing rate of the electrode material is more preferably 1 mm/sec or more, further preferably 5 mm/sec or more, and still further preferably 10 mm/sec or more.

When the thickness of the spacer 2 sandwiched between the collector plate 1 and the ion exchange membrane 3 (hereinafter, referred to as "spacer thickness") is 0.3 to 3 mm, the basis weight of the third electrode material is preferably 50 to 500 g/m$^2$, and more preferably 100 to 400 g/m$^2$. By controlling the basis weight to be in the above range, the ion exchange membrane 3 can be prevented from being damaged while ensuring liquid permeability. In recent years, from the viewpoint of lowering the resistance, the thickness of the ion-exchange membrane 3 tends to decrease, and a treatment and a use method for reducing a damage to the ion exchange membrane 3 are extremely important. From the above viewpoint, it is more preferable to use, in the third electrode material, a nonwoven fabric or paper having one surface flattened as a base material. As a flattening method, any known method can be used, and examples thereof include a method in which a slurry is applied to one surface of carbonaceous fiber and dried; and a method in which impregnating and drying are performed on a smooth film such as PET.

The thickness of the third electrode material is preferably at least larger than the spacer thickness. For example, when a low-density material such as a nonwoven fabric is used as the carbonaceous fibers, and the carbon particles other than graphite particles and the carbonaceous material with binding properties used in the third electrode material are supported on the carbonaceous fibers, the thickness of the third electrode material is preferably 1.5 to 6.0 times the spacer thickness. However, if the thickness of the third electrode material is too large, it may break through the ion-exchange membrane 3 due to the compressive stress of the sheet-like material. For this reason, it is preferable to use the third electrode material having a compressive stress of 9.8 $N/cm^2$ or less. In order to adjust the compressive stress and the like according to the basis weight and thickness of the third electrode material, the third electrode material may be used in a laminated state of two layers, three layers, or the like. It is also possible to combine the third electrode material with an electrode material in another form.

The BET specific surface area determined from the adsorbed nitrogen amount of the third electrode material is preferably 0.5 $m^2/g$ or more, more preferably 1 $m^2/g$ or more. When the BET specific surface area is less than 0.5 $m^2/g$, the degree of exposure of the edge planes of the carbon particles (B) other than graphite particles is reduced, and a contact area with the electrolyte is also reduced, so that a desired low resistance cannot be obtained. The upper limit of the BET specific surface area is not particularly limited from the above viewpoint, but is generally preferably 1500 $m^2/g$ or less in consideration of formation of a conduction path between particles, adhesion of carbon particles other than graphite particles to fiber, and the like.

The third electrode material is used in a negative electrode of a redox flow battery using a Mn—Ti electrolyte (Mn—Ti redox flow battery). As described above, the Mn—Ti electrolyte uses manganese in the positive electrode and titanium in the negative electrode, and is not particularly limited as long as it is an electrolyte containing these active materials.

The type of electrode material used in a positive electrode of a Mn—Ti redox flow battery is not particularly limited as long as it is commonly used in this technical field. Carbon fiber paper or the like used in a fuel cell may be used, or the third electrode material may be used, as it is, in the positive electrode. For example, in short-term use (for example, when the total time of a charge and discharge test is 3 hours as in the examples described later), the third electrode material can be used in the positive electrode, and it has been confirmed that the cell resistance during initial charge and discharge can be reduced (see the examples described later). In the examples described later, the same samples were used in the positive electrode and the negative electrode. However, the electrode material is not limited to this, and electrode materials having different compositions may be used as long as the requirements for the third electrode material are satisfied.

However, since the electrode may be decomposed into CO and $CO^2$ by the strong oxidizing power of manganese in repeated charges and discharges over a long term, it is recommended that an electrode having oxidation resistance (for example, a polyacrylonitrile carbon fiber felt fired at 2000° C. or higher) be used as the positive electrode, and the third electrode material be used on the negative electrode side.

[III-3. Method for Producing Third Carbon Electrode Material]

Next, a method for producing the third electrode material will be described. The third electrode material can be produced by impregnating carbonaceous fibers (base material) with carbon particles other than graphite particles and a carbonaceous material precursor (before being carbonized), and then letting the carbonaceous fibers go through a carbonization step, a graphitization step, and an oxidation treatment step. In each step, any known method can be used.

Hereinafter, each step will be described.

(Step of Impregnating Carbonaceous Fiber with Carbon Particles Other than Graphite Particles and Carbonaceous Material Precursor)

First, a carbonaceous fiber is impregnated with carbon particles other than graphite particles and a carbonaceous material precursor. For impregnating the carbonaceous fibers with the carbon particles other than graphite particles and the carbonaceous material precursor, any known method can be adopted. For example, there can be mentioned a method in which the above carbonaceous material precursor is heated and melted, carbon particles other than graphite particles are dispersed in the obtained melt, and the carbonaceous fibers are immersed in the melt dispersion and then cooled to room temperature. Alternatively, as shown in the examples described later, a method can be used in which the above carbonaceous material precursor and carbon particles other than graphite particles are dispersed in a solvent such as water or alcohol to which a binder (temporary adhesive) that disappears during carbonization, such as polyvinyl alcohol, is added, and the carbonaceous fibers are immersed in this dispersion liquid, and then dried by heating. Excess liquid of the above-mentioned melt dispersion or dispersion liquid in which the carbonaceous fibers are immersed can be removed by passing it through a nip roller with a predetermined clearance to squeeze excess dispersion liquid contained when immersed in the dispersion liquid, or by using a doctor blade or the like to scrape excess dispersion liquid attached on the surface when immersed in the dispersion liquid.

Thereafter, drying is performed at, for example, 80 to 150° C. in an air atmosphere.

(Carbonization Step)

The carbonization step is performed in order to fire the product after being impregnated obtained in the above step, thereby binding the carbonaceous fibers via the carbon particles other than graphite particles. In the carbonization step, it is preferable to sufficiently remove a decomposition gas generated during carbonization. For example, heating is preferably performed at a temperature of 800° C. or higher and 2000° C. or lower in an inert atmosphere (preferably in a nitrogen atmosphere). The heating temperature is more preferably 1000° C. or higher, further preferably 1200° C. or higher, and still further preferably 1300° C. or higher, and is more preferably 1500° C. or lower, and further preferably 1400° C. or lower.

As described above, a treatment corresponding to the carbonization step may be performed also after flameproofing of the fiber, and the carbonization treatment after flameproofing of the fiber may be omitted. That is, a method for producing the third electrode material is broadly divided into the following methods 1 and 2.

Method 1: flameproofing of fiber→carbonization of fiber-→impregnation with carbon particles other than graphite particles and carbonaceous material-carbonization→graphitization→oxidation Method 2: flameproofing of fiber→impregnation with carbon particles other than graphite particles and carbonaceous material→carbonization→graphitization→oxidation According to the above method 1, although the processing cost increases because the carbonization is performed twice, a sheet used as the electrode material is hardly affected by a difference in volume shrinkage ratio, and thus, there is an advantage that the obtained sheet is unlikely to deform (warp). On the other hand, according to the above method 2, the carbonization step may be performed only once, so that the processing cost can be reduced. However, the sheet obtained tends to deform due to a difference in volume shrinkage ratio at the time of carbonization of each material. The choice as to which of the above methods 1 and 2 should be adopted may be appropriately made in consideration of the above points.

(Graphitization Step)

The graphitization step is performed in order to sufficiently increase the crystallinity of the carbonaceous material and to improve electron conductivity and oxidation resistance to a sulfuric acid solution or the like in the electrolyte. After the carbonization step, it is preferable to further perform heating in an inert atmosphere (preferably, in a nitrogen atmosphere) at a temperature that is 1300° C. or higher and that is higher than the heating temperature in the carbonization step, and more preferably 1500° C. or higher. The upper limit of the heating temperature in the graphitization step is preferably 2000° C. or lower in consideration of providing a high affinity for the electrolyte to the carbonaceous material.

Patent Document 4 described above differs from the method for producing the third electrode material in that the graphitization step is not performed.

(Oxidation Treatment Step)

After the graphitization step, an oxidation treatment step is further performed, so that an oxygen-functional group such as a hydroxyl group, a carbonyl group, a quinone group, a lactone group, and a free-radical oxide is introduced to the surface of the electrode material. As a result, the above-mentioned O/C ratio≥1% can be achieved. Since these oxygen-functional groups greatly contribute to the electrode reaction, a sufficiently low resistance can be obtained. In addition, the water passing rate can be increased.

As the oxidation treatment step, various treatment steps such as wet chemical oxidation, electrolytic oxidation, and dry oxidation can be used, and a dry oxidation treatment step is preferred from the viewpoints of workability and production costs. The dry oxidation treatment step means a step of heating (oxidizing treatment) in an air atmosphere, for example, at 500° C. or higher and 900° C. or lower. In order to effectively exert the effect of the introduction of the oxygen-functional group, the heating temperature is more preferably 600° C. or higher, and further preferably 650° C. or higher. In addition, the heating temperature is more preferably 800° C. or lower, and further preferably 750° C. or lower.

Furthermore, in the dry oxidation treatment step, it is preferable to adjust a mass yield of the electrode material before and after the oxidation treatment to 90% or more and 96% or less from the viewpoint of maintaining the mechanical strength of the electrode material. The mass yield can be adjusted by a method such as appropriately adjusting a treatment time and temperature of dry air oxidation.

This application claims benefit of priorities based on Japanese Patent Application No. 2017-172122 fled on Sep. 7, 2017, Japanese Patent Application No. 2017-172123 filed on Sep. 7, 2017, and Japanese Patent Application No. 2017-172124 filed on Sep. 7, 2017. The entire contents of the specifications of Japanese Patent Application No. 2017-172122 filed on Sep. 7, 2017, Japanese Patent Application No. 2017-172123 filed on Sep. 7, 2017, and Japanese Patent Application No. 2017-172124 filed on Sep. 7, 2017 are incorporated herein by reference.

EXAMPLES

Hereinafter, the present invention will be more specifically described with reference to examples and comparative examples, but the invention is not limited to the following examples. In the following, "%" means "% by mass" unless otherwise specified.

In the examples, the following items were measured. The details of the measurement methods are as follows.

(1) Measurement of Crystallite Size (Lc) in C-Axis Direction by X-Ray Diffraction (1-1) First Electrode Material Lc (A) of the carbonaceous fibers and Lc (B) of the carbonaceous material in the first electrode material were measured as described below.

For each (single sample) of the carbonaceous fibers and the carbonaceous materials used in the examples, the same heat treatments as in Example 1 were sequentially performed, and the measurement was performed using a finally treated sample. Basically, it is believed that the crystallinity of carbon is governed by the influence of thermal energy applied to the sample, and a thermal history with the highest temperature applied to the sample determines the crystallinity of Lc. However, depending on the degree of the subsequent oxidation treatment, a graphene laminated structure formed during the graphitization step may be disturbed, and the crystallinity may be reduced due to the occurrence of a defect structure or the like. Therefore, the finally treated sample was used for the measurement.

Each single sample collected as described above was crushed to about a particle diameter of 10 μm in an agate mortar. To the crushed sample, X-ray standard high-purity silicon powder was mixed, as an internal standard substance, at about 5% by mass. The resulting mixture was put into a sample cell to measure a wide-angle X-ray by the diffractometer method using CuKα ray as a ray source.

The Lc value of each of the carbonaceous fibers (A) and the carbonaceous material (B) used in the first electrode material was calculated by peak separation from a chart obtained by the above wide-angle X-ray measurement. Specifically, a peak having a top in a range where a value twice (2θ) as large as a diffraction angle θ was 25.3° to 25.7 was taken as the carbonaceous material (B). A peak shape as a sine wave was determined from each peak top, and then a peak shape as a sine wave was determined from the foot portion observed in the vicinity of 24.0° to 25.0°, which was taken as the carbonaceous fiber (A). From the two peaks separated by the above method, each Lc value was calculated by the following method.

A curve was corrected not in terms of so-called the Lorenz factor, the polarization factor, the absorption factor, the atom-scattering factor, etc. but done so using a following simple method. That is, from a base-line of a peak which corresponded to a <002> diffraction, an effective strength was re-plotted to obtain a <002> corrected strength curve. From a length (half width β) of a line segment at which a line parallel to an angular axis drawn at a ½ height of the peak height of this curve intersected with the corrected strength curve, the crystallite size Lc in the c-axis direction was determined according to the following equation.

$$Lc=(k\cdot\lambda)/(\beta\cdot\cos\theta)$$

where the structural coefficient k=0.9, the wavelength λ=1.5418 Å, β indicates a half width of a <002> diffraction peak, and θ indicates a <002> diffraction angle.

(1-2) Second Electrode Material

Lc (A) of the carbonaceous fiber, Lc (B) of the graphite particles, and Lc (C) of the carbonaceous material in the second electrode material were measured as described below.

For each (single sample) of the carbonaceous fibers, the graphite particles, and the carbonaceous materials used in the examples, the same heat treatments as in Example 2 were sequentially performed, and the measurement was performed using a finally treated sample. Basically, it is believed that the crystallinity of carbon is governed by the influence of thermal energy applied to the sample, and a thermal history with the highest temperature applied to the sample determines the crystallinity of Lc. However, depending on the degree of the subsequent oxidation treatment, a graphene laminated structure formed during the graphitization step may be disturbed, and the crystallinity may be reduced due to the occurrence of a defect structure. Therefore, the finally treated sample was used for the measurement.

Each single sample collected as described above was crushed to about a particle diameter of 10 μm in an agate mortar. To the crushed sample, X-ray standard high-purity silicon powder was mixed, as an internal standard substance, at about 5% by mass. The resulting mixture was put into a sample cell to measure a wide-angle X-ray by the diffractometer method using CuKα ray as a ray source.

The Lc value of each of the carbonaceous fibers (A), the graphite particles (B), and the carbonaceous material (C) that binds these that were used in the second electrode material was calculated by peak separation from a chart obtained by the wide-angle X-ray measurement. Specifically, a peak having a top in a range where a value twice (2θ) as large as a diffraction angle θ was 26.4° to 26.6° was taken as the graphite particles (B), and a peak having a top in a range where the value (2θ) was 25.7° to 26.2° was taken as the carbonaceous material (C). A peak shape as a sine wave was determined from each peak top, and then a peak shape as a sine wave was determined from the foot portion observed in the vicinity of 24.0° to 25.0°, which was taken as the carbonaceous fibers (A). When the peak tops of the graphite particles (B) and the carbonaceous material (C) could not be separated, a peak shape as a sine wave was determined from the foot portion observed in the vicinity of 24.0° to 26.0° to separate both. From the three peaks separated by the above method, each Lc value was calculated by the following method.

A curve was corrected not in terms of so-called the Lorenz factor, the polarization factor, the absorption factor, the atom-scattering factor, etc. but done so using a following simple method. That is, from a base-line of a peak which corresponded to a <002> diffraction, an effective strength was re-plotted to obtain a <002> corrected strength curve. From a length (half width β) of a line segment at which a line parallel to an angular axis drawn at a ½ height of the peak height of this curve intersected with the corrected strength curve, the crystallite size Lc in the c-axis direction was determined according to the following equation.

$$Lc=(k\cdot\lambda)/(\beta\cdot\cos\theta)$$

where the wavelength λ=1.5418 Å, the structural coefficient k=0.9, β indicates a half width of a <002> diffraction peak, and θ indicates a <002> diffraction angle.

(1-3) Third Electrode Material

Lc (A) of the carbonaceous fibers, Lc (B) and La (B) of the carbon particles other than graphite particles, and Lc (C) of the carbonaceous material in the third electrode material were measured as described below.

For each (single sample) of the carbonaceous fibers, the carbon particles other than graphite particles, and the carbonaceous materials used in the examples, the same heat treatments as in Example 1 were sequentially performed, and the measurement was performed using a finally treated sample. Basically, it is believed that the crystallinity of carbon is governed by the influence of thermal energy applied to the sample, and a thermal history with the highest temperature applied to the sample determines the crystallinity of Lc. However, depending on the degree of the subsequent oxidation treatment, a graphene laminated structure formed during the graphitization step may be disturbed, and the crystallinity may be reduced due to the occurrence of a defect structure. Therefore, the finally treated sample was used for the measurement.

Each single sample collected as described above was crushed to about a particle diameter of 10 μm in an agate mortar. To the crushed sample, X-ray standard high-purity silicon powder was mixed, as an internal standard substance, at about 5% by mass. The resulting mixture was put into a sample cell to measure a wide-angle X-ray by the diffractometer method using CuKα ray as a ray source.

The Lc value of each of the carbonaceous fibers (A), the carbon particles (B) other than graphite particles, and the carbonaceous material (C) that binds these that were used in the third electrode material was calculated by peak separation from a chart obtained by the above wide-angle X-ray measurement. Specifically, a peak having a top in a range where a value twice (2θ) as large as a diffraction angle θ was 26.4° to 26.6° was taken as the carbon particles (B) other than graphite particles, and a peak having a top in a range where the value (2θ) was 25.3° to 25.7° was taken as the carbonaceous material (C). A peak shape as a sine wave was determined from each peak top, and then a peak shape as a sine wave was determined from the foot portion observed in the vicinity of 24.0° to 25.0°, which was taken as the carbonaceous fibers (A). From the three peaks separated by the above method, each Lc value was calculated by the following method.

A curve was corrected not in terms of so-called the Lorenz factor, the polarization factor, the absorption factor, the atom-scattering factor, etc. but done so using a following simple method. That is, from a base-line of a peak which corresponded to a <002> diffraction, an effective strength was re-plotted to obtain a <002> corrected strength curve. From a length (half width β) of a line segment at which a line parallel to an angular axis drawn at a ½ height of the peak height of this curve intersected with the corrected strength curve, the crystallite size Lc in the c-axis direction was determined according to the following equation.

$$Lc=(k-\lambda)/(\beta-\cos\theta)$$

where the structural coefficient k=0.9, the wavelength λ=1.5418 Å, β indicates a half width of a <002> diffraction peak, and θ indicates a <002> diffraction angle.

(2) Measurement of O/C by XPS Surface Analysis

In the measurement by an X-ray photoelectron spectroscopy, which is abbreviated as ESCA or XPS, an apparatus of ULVAC-PHI 5801MC was used.

First, the sample was fixed on a sample holder with a Mo plate, put in a preliminary exhaust chamber to exhaust sufficiently, and then placed into a chamber of a measurement room. A monochromed Al Kα ray was used as a ray source, the output was 14 kV, 12 mA, and the degree of vacuum in the apparatus was $10^{-8}$ torr.

All elements scanning was performed to examine the composition of the surface elements, and a narrow scanning was performed on the detected elements and the expected elements to evaluate an existence ratio.

The ratio of the number of surface-bound oxygen atoms to the total number of surface carbon atoms was calculated as a percentage (%) to determine the O/C.

(3) Charge and Discharge Test

Each electrode material obtained by a method described later was cut into an electrode area of 8.91 cm$^2$ with a size of 2.7 cm in a vertical direction (permeation direction) and 3.3 cm in a width direction, and introduced into only the positive electrode side. At this time, the number of sheets was adjusted so that the basis weight in the cell was 230 to 350 g/m$^2$. On the negative electrode side, two sheets of electrode material prepared as described below were laminated, and the cell of FIG. 1 was assembled. A Nafion 212 membrane was used as an ion exchange membrane, and the spacer thickness was 0.5 mm. From the voltage curve after 10 cycles were repeated in the voltage range of 1.65 to 1.00 V at a current density of 144 mA/cm$^2$, the total cell resistance ($\Omega \cdot cm^2$) was calculated by the following equation. As both of the electrolytes for the positive electrode and the negative electrode, a 5.0 mol/L sulfuric-acid aqueous solution in which 1.0 mol/L each of titanium oxysulfate and manganese oxysulfate were dissolved was used. The amount of each of the electrolytes was set largely excessive as against the cell and the piping. The flow quantity was 10 mL/min, and the measurement was performed at 35° C.

$$\frac{\text{Total Cell}}{\text{resistance}} = \frac{V_{C50} - V_{D50}}{2 \times I} (\Omega \cdot cm^2) \quad \text{[Equation 1]}$$

where $V_{C50}$ is a charging voltage with respect to a quantity of electricity at a charging rate of 50%, which is obtained from an electrode curve;

$V_{D50}$ is a discharging voltage with respect to a quantity of electricity at a charging rate of 50%, which is obtained from an electrode curve; and $I$=current density(mA/cm$^2$).

<Production Method of Negative Electrode Material>

A plain weave cloth (thickness: 1.0 mm, basis weight: 600 g/m) made of polyacrylonitrile fiber having an average fiber diameter of 16 μm was heated at 300° C. in an air atmosphere to be flameproofed, and fired at 1000° C. for one hour in a nitrogen atmosphere. Then, the cloth was heated at 600° C. for 8 minutes in an air atmosphere, and fired at 1800° C. for one hour in a nitrogen atmosphere. Furthermore, by being subjected to a treatment at 700° C. for 15 minutes in an air atmosphere, a negative electrode material having a basis weight of 152 g/m$^2$ and a thickness of 0.73 mm was obtained.

(4) Oxidation Resistance Test (4-1) Oxidation Resistance of Carbon Particles (Including Graphite Particles)

A battery using a platinum wire as a working electrode and an Ag/AgCl electrode as a reference electrode was charged with an electrolyte composed of a 5.0 mol/L sulfuric acid aqueous solution of 1.0 mol/L titanium oxysulfate and a 5.0 mol/L sulfuric acid aqueous solution of 1.0 mol/L manganese oxysulfate until an open voltage became 1.266 V. The carbon particles used in the examples were immersed in the above electrolyte of an amount of 40 times the carbon particles, and allowed to stand at 75° C. for 16 hours. After allowing to cool to room temperature, the open voltage of the electrolyte (working electrode: platinum wire; reference electrode: Ag/AgCl) was measured, and the oxidation resistance was estimated based on the degree of voltage drop from 1.266 V.

(4-2) Oxidation Resistance of Electrode Material

A battery using a platinum wire as a working electrode and an Ag/AgCl electrode as a reference electrode was charged with an electrolyte composed of a 5.0 mol/L sulfuric acid aqueous solution of 1.0 mol/L titanium oxysulfate and a 5.0 mol/L sulfuric acid aqueous solution of 1.0 mol/L manganese oxysulfate until an open voltage became 1.266 V. The prepared electrode material was immersed in a charging solution of an amount of 40 times the weight of the electrode, and allowed to stand at 75° C. for 16 hours. After allowing to cool to room temperature, the open voltage of the electrolyte (working electrode: platinum wire; reference electrode: Ag/AgCl) was measured, and the oxidation resistance was estimated based on the degree of voltage drop from 1.266 V.

(5) Water Passing Test

One droplet of ion-exchange water was dropped onto the electrode from a pipette with a diameter of 3 mm at a height of 5 cm above the electrode. The time required for the droplet to permeate the electrode was measured, and the water passing rate was calculated by the following equation.

Water passing rate(mm/sec)=thickness of electrode material(mm)/time until water droplet permeating(sec)

[First Electrode Material]

Example 1

In this example, electrode materials were prepared as follows using the carbonaceous fibers (A) and the carbonaceous materials (B) shown in Table 1, and various items were measured for each of the prepared electrode materials. (No. 1)

<Impregnation of Nonwoven Fabric with Carbonaceous Material (Binder)>

40% coal tar (manufactured by Alfa Aesar) as a carbonaceous material and 60% toluene were mixed to prepare a solution, carbon paper (CFP-030-PE manufactured by Nippon Polymer Sangyo Co., Ltd., basis weight: 30 g/m$^2$, thickness: 0.51 mm) made of polyacrylonitrile fiber (average fiber diameter: 10 μm) was immersed in this solution, and then the resulting carbon paper was squeezed with a mangle (roller set pressure: 1 kgf, rotation speed: 1 m/min) to obtain a nonwoven fabric that was impregnated with coal tar.

<Carbonization of Nonwoven Fabric>

The thus obtained nonwoven fabric was dried at 150° C. for 30 minutes in an air atmosphere, the temperature was raised to 1000° C.±50° C. at a rate of 5° C./min nitrogen gas, and the nonwoven fabric was held at this temperature for one hour to perform carbonization (firing) and then cooled.

Furthermore, the temperature was raised to 2000° C. 50° C. at a rate of 5° C./min nitrogen gas, and the nonwoven fabric was held at this temperature for one hour to perform graphitization and then cooled. Then, the nonwoven fabric was subjected to an oxidation treatment at 700° C. for 20 minutes in an air atmosphere to obtain an electrode material No. 1 (basis weight: 53 g/m², thickness: 0.52 mm).

(No. 2)

Impregnation with the carbonaceous material and carbonization of the nonwoven fabric were performed to obtain an electrode material No. 2 (basis weight: 82 g/m², thickness: 0.53 mm) in the same manner as in the above No. 1 except that a mixed solution of 80% coal tar and 20% toluene was used in the <Impregnation with Carbonaceous Material (Binder)> of No. 1.

(No. 3)

Impregnation with the carbonaceous material and carbonization of the nonwoven fabric were performed to obtain an electrode material No. 3 (basis weight: 87 g/m², thickness: 0.56 mm) in the same manner as in the above No. 1 except that, in the <Impregnation with Carbonaceous Material (Binder)> of No. 1, Rheodol TW-L120 manufactured by Kao Corporation: 1.8%, polyvinyl alcohol: 1.8%, and a pitch material of MCP250 manufactured by JFE Chemical Corporation as a carbonaceous material: 14% were added to an ion-exchange water, and a solution prepared by stirring the resulting mixture for one hour by a mechanical stirrer was used.

(No. 4)

Impregnation with the carbonaceous material and carbonization of the nonwoven fabric were performed to obtain an electrode material No. 4 (basis weight: 35 g/m², thickness: 0.52 mm) in the same manner as in the above No. 1 except that, in the <Impregnation with Carbonaceous Material (Binder)> of No. 1, a mixed solution of 10% coal tar and 90% toluene was used.

(No. 5)

Impregnation with the carbonaceous material and carbonization of the nonwoven fabric were performed to obtain an electrode material No. 5 (basis weight: 52 g/m², thickness: 0.55 mm) in the same manner as in the above No. 1 except that, in the <Impregnation with Carbonaceous Material (Binder)> of No. 1, a mixed solution of 5% phenolic resin PSK-2320 manufactured by Gun Ei Chemical Industry Co., Ltd. as a carbonaceous material and 95% acetone was used.

(No. 6)

Impregnation with the carbonaceous material and carbonization of the nonwoven fabric were performed to obtain an electrode material No. 6 (basis weight: 223 g/m², thickness: 1.8 mm) in the same manner as in No. 1 except that a rayon felt (basis weight: 180 g/m², thickness: 1.5 mm) was used instead of the nonwoven fabric.

(No. 7)

No. 7 is an example in which no carbonaceous material was used in No. 1.

Specifically, without performing the <Impregnation with Carbonaceous Material (Binder)> in No. 1, the <Carbonization of Nonwoven Fabric> was performed to obtain an electrode material No. 7 (basis weight: 30 g/m², thickness: 0.6 mm).

For the electrode materials Nos. 1 to 7 thus obtained, various items were measured, and these results are shown together in Table 1.

TABLE 1

| No. | Carbonaceous fibers (A) Type | Lc (A) (nm) | Carbonaceous material (B) Type | Lc (B) (nm) | Lc(B)/Lc(A) | Basis weight of carbonaceous fiber structure (1) (g/m²) | Basis weight of carbonaceous material (2) (g/m²) | Total basis weights (1) + (2) (g/m²) | Content of carbonaceous material (2)/((1) + (2)) (%) |
|---|---|---|---|---|---|---|---|---|---|
| 1 | Polyacrylonitrile fiber | 2.3 | Coal tar | 18.0 | 7.8 | 31 | 22 | 53 | 41.5 |
| 2 | Polyacrylonitrile fiber | 2.3 | Coal tar | 18.0 | 7.8 | 28 | 54 | 82 | 65.9 |
| 3 | Polyacrylonitrile fiber | 2.3 | Pitch material | 12.0 | 6.2 | 30 | 57 | 87 | 65.6 |
| 4 | Polyacrylonitrile fiber | 2.3 | Coal tar | 18.0 | 7.8 | 29 | 6 | 35 | 17.1 |
| 5 | Polyacrylonitrile fiber | 2.3 | Phenol resin | 1.5 | 0.7 | 29 | 23 | 52 | 44.2 |
| 6 | Rayon felt | 1.4 | Coal tar | 18.0 | 12.9 | 178 | 45 | 223 | 20.2 |
| 7 | Polyacrylonitrile fiber | 2.3 | None | — | — | 30 | 0 | 30 | 0 |

| No. | Ratio of the number of oxygen atoms to the number of carbon atoms (O/C) | Total cell resistance ($\Omega \cdot cm^2$) | Oxidation resistance test (V vs Ag/AgCl) | Water passing rate (mm/sec) |
|---|---|---|---|---|
| 1 | 2.0 | 1.05 | 1.253 | 1.1 |
| 2 | 2.3 | 1.06 | 1.259 | 1.1 |
| 3 | 2.2 | 0.95 | 1.242 | 0.7 |
| 4 | 2.4 | 0.97 | 1.217 | 0.9 |
| 5 | 4.5 | 1.57 | 1.210 | 1.3 |
| 6 | 5.3 | 0.98 | 1.148 | 1.4 |
| 7 | 0.6 | 0.91 | 1.211 | 0.3 |

Nos. 1 to 3 satisfying the requirements for the first electrode material were more excellent in oxidation resistance, while maintaining almost the same degree of resistance, as compared with No. 7, in which no carbonaceous material was used. No. 7 had a low O/C ratio, and thus the water passing rate decreased.

On the other hand, as for No. 4 having a small content of the carbonaceous material, the oxidation resistance was lower than the oxidation resistances of the examples of the present invention, and only a similar level of the effect to No. 7 was attained. This result indicates that an amount equal to or larger than a predetermined amount of the carbonaceous material is required for the protection of the fibers.

As for No. 5 having a small Lc (B) and a small ratio of Lc (B)/Lc (A), the cell resistance rose, and the oxidation resistance was also as low as in No. 7. From these results, it is inferred that, in Nos. 1 to 3 of the examples of the present invention, the carbonaceous materials that strongly bind the carbonaceous fibers and have sufficiently high crystallinity were selected as a carbonaceous material for coating the surfaces of the carbonaceous fibers.

As for No. 6 having a large ratio of Lc (B)/Lc (A), the oxidation resistance was lower than the oxidation resistance of No. 7. The reason therefor is inferred that, when the crystallinity of the carbonaceous fibers as the base material was low, uncoated portions on the surfaces of the carbonaceous fibers were first oxidized. This result indicates that carbonaceous fibers having a degree equal to or larger than a predetermined degree of crystallinity are required for ensuring of excellent oxidation resistance.

[Second Electrode Material]

Example 2

In this example, for each of various carbon particles (types: A to F, A', a, and b) shown in Table 2, the particle diameter, Lc, was measured, and an oxidation resistance test was performed to evaluate an oxidation resistance.

Among the types A to F, the types A to D are graphites satisfying the requirements specified in the second electrode material, the types A, B and C are flaky graphites, and the type D is exfoliated graphite. The type E is flaky graphite having a small Lc, and the type F is flaky graphite having a particle diameter of less than 1 μm and a small Lc. The type A' is obtained by pulverizing the type A with a bead mill using a LABSTAR Mini manufactured by Ashizawa Finetech Ltd. for 6 hours, and is an example having a small L. The types a and b are carbon blacks.

Carbon particles used are all commercially-available products, and the particle diameters shown in Table 2 are values shown on the catalogs. The particle diameter of the type A' was measured by a laser diffraction method.

These results were shown together in Table 2.

TABLE 2

| Type of carbon particles | | Particle diameter | Lc | Oxidation resistance test |
|---|---|---|---|---|
| Symbol | Type | (μm) | (nm) | (V vs Ag/AgCl) |
| A | Graphite | 9.00 | 35.1 | 1.216 |
| B | Graphite | 15.00 | 38.2 | 1.227 |
| C | Graphite | 19.00 | 36.1 | 1.221 |
| D | Graphite | 5.00 | 36.2 | 1.178 |
| a | Carbon black | 0.04 | 1.3 | 0.622 |
| b | Carbon black | 0.05 | 1.9 | 0.556 |
| E | Graphite | 3.00 | 29.2 | 0.612 |
| A' | Graphite | 2.00 | 24.9 | 0.922 |
| F | Graphite | Less than 1 | 14.9 | 0.504 |

As shown in Table 2, the types A to D satisfying the requirements (particle diameter: 1 μm or more, Lc=35 nm or more) for the graphite particles specified in the second electrode material were all excellent in oxidation resistance and exhibited high durability. The reason therefor is considered that the excessive exposure of the edge planes to become an origin of oxidative degradation can be suppressed.

On the other hand, each of the types a and b, which is carbon black instead of graphite, had significantly decreased oxidation resistance. The reason therefor is considered that the amorphous carbon portion was easily oxidized and degraded due to insufficient crystallinity of carbon.

It was also found that graphite particles having Lc of less than 35 nm, such as the types E, F and A', also had poor oxidation resistance. This is considered to be due to the excessive exposure of the edge planes.

Example 3

In this example, for electrode materials prepared in the following manner using some of the carbon particles in Table 2, various items were measured.

(No. 1)

In No. 1, polyacrylonitrile fiber was used as carbonaceous fibers, the type C in Table 2 was used as graphite particles (an example satisfying the requirements for the second electrode material), and a pitch material of coal tar pitch MCP250 manufactured by JFE Chemical Corporation was used as a carbonaceous material to prepare an electrode material in the following manner.

First, to an ion-exchange water, Rheodol TW-L120 (non-ionic surfactant) manufactured by Kao Corporation: 1.8%, polyvinyl alcohol (temporary adhesive): 1.8%, MCP250 (carbonaceous material) manufactured by JFE Chemical Corporation: 14%, and the type C in Table 2 as graphite powder: 9.8% were added. The resulting mixture was stirred for one hour by a mechanical stirrer to obtain a dispersion liquid.

In the dispersion liquid thus obtained, carbon paper (CFP-030-PE manufactured by Nippon Polymer Sangyo Co., Ltd., basis weight: 30 g/m$^2$, thickness: 0.51 mm) made of polyacrylonitrile fiber (average fiber diameter: 10 μm) was immersed, and then passed through a nip roller to remove excess dispersion liquid.

Next, the resulting carbon paper was dried at 150° C. for 20 minutes in an air atmosphere, subjected to carbonization (firing) at 1000° C. for one hour, and then further subjected to graphitization at 2000° C. for one hour. After the graphitization, an oxidation treatment was further performed at 700° C. for 20 minutes in an air atmosphere to obtain an electrode material (No. 1) having a thickness of 0.50 mm and a basis weight of 134.0 g/m$^2$.

(No. 2)

An electrode material No. 2 (thickness: 0.48 mm, basis weight: 144.0 g/m$^2$) was prepared in the same manner as in the above No. 1 except that the type A in Table 2 (an example satisfying the requirements for the second electrode material) was used as graphite powder; and the contents of the graphite particles and the carbonaceous material relative to the total amount of the carbonaceous fibers, the graphite particles and the carbonaceous material were changed as shown in Table 3.

(No. 3)

An electrode material No. 3 (thickness: 0.45 mm, basis weight: 126.0 g/m$^2$) was prepared in the same manner as in the above No. 1 except that the type B in Table 2 (an example satisfying the requirements for the second electrode material) was used as graphite powder; and the contents of the graphite particles and the carbonaceous material relative to the total amount of the carbonaceous fibers, the graphite particles and the carbonaceous material were changed as shown in Table 3.

(No. 4)

An electrode material No. 4 (thickness: 0.53 mm, basis weight: 177.1 g/m$^2$) was prepared in the same manner as in the above No. 1 except that the type D in Table 2 (an example satisfying the requirements for the second electrode material) was used as graphite powder and added so as to be 4.9% in the ion-exchange water; and the contents of the graphite particles and the carbonaceous material relative to the total amount of the carbonaceous fibers, the graphite particles and the carbonaceous material were changed as shown in Table 3.

(No. 5)

An electrode material No. 5 (thickness: 0.51 mm, basis weight: 164.0 g/m$^2$) was prepared in the same manner as in the above No. 4 except that the type C in Table 2 (an example satisfying the requirements for the second electrode material) was used as graphite powder; and the contents of the graphite particles and the carbonaceous material relative to the total amount of the carbonaceous fibers, the graphite particles and the carbonaceous material were changed as shown in Table 3.

(No. 6)

An electrode material No. 6 (thickness: 0.16 mm, basis weight: 51.4 g/m$^2$) was prepared in the same manner as in the above No. 1 except that carbon paper (CFP-010-PV manufactured by Nippon Polymer Sangyo Co., Ltd., basis weight: 10 g/m$^2$, thickness: 0.19 mm) made of polyacrylonitrile fiber (average fiber diameter: 10 μm) was used as carbonaceous fibers, and the type B in Table 2 (an example satisfying the requirements for the second electrode material) was used as graphite powder; and the contents of the graphite particles and the carbonaceous material relative to the total amount of the carbonaceous fibers, the graphite particles and the carbonaceous material were changed as shown in Table 3.

(No. 7)

An electrode material No. 7 (thickness: 0.47 mm, basis weight: 127.0 g/m$^2$) was prepared in the same manner as in the above No. 1 except that carbon paper (thickness: 0.61 mm, basis weight: 30 g/m$^2$) made of anisotropic pitch fiber was used as carbonaceous fibers; and the contents of the graphite particles and the carbonaceous material relative to the total amount of the carbonaceous fibers, the graphite particles and the carbonaceous material were changed as shown in Table 3.

(No. 8)

In No. 8, the type a in Table 2 was used instead of graphite powder, and TD-4304 manufactured by DIC Corporation was used as a carbonaceous material.

Specifically, an electrode material (a comparative example) No. 8 (thickness: 0.50 mm, basis weight: 121.0 g/m$^2$) was prepared in the same manner as in the above No. 1 except that, to an ion-exchange water, Ketjenblack aqueous dispersion (W-311N) manufactured by Lion Corporation: 5% was added instead of graphite powder, and an aqueous dispersion of phenol resin (TD4304) 10% was added; and the contents of the graphite particles and the carbonaceous material relative to the total amount of the carbonaceous fibers, the graphite particles and the carbonaceous material were changed as shown in Table 3.

(No. 9)

An electrode material (a comparative example) No. 9 (thickness: 0.53 mm, basis weight: 152.0 g/m$^2$) was prepared in the same manner as in the above No. 1 except that the type E in Table 2 (an example not satisfying the requirements for the second electrode material) was used as graphite powder; and the contents of the graphite particles and the carbonaceous material relative to the total amount of the carbonaceous fibers, the graphite particles and the carbonaceous material were changed as shown in Table 3.

(No. 10)

An electrode material No. 10 (thickness: 0.49 mm, basis weight: 87.0 g/m$^2$) was prepared in the same manner as in the above No. 1 except that no graphite particles were used.

(No. 11)

In No. 11, an electrode material was obtained by treating the carbonaceous fibers in the following manner without using graphite particles and a carbonaceous material.

Specifically, in No. 1, a Malifleece woven fabric (thickness: 0.6 mm, basis weight: 120 g/m$^2$) made of flameproofed polyacrylonitrile fiber was subjected to carbonization (firing) at 1000° C. for one hour in a nitrogen atmosphere and then subjected to graphitization at 2000° C. for one hour, and no oxidation treatment was performed to prepare an electrode material (a comparative example) No. 11 (thickness: 0.6 mm, basis weight: 55.0 g/m$^2$). The temperature rise rate when raising the temperature from the flameproofing temperature to the carbonization temperature was the same as in No. 1.

(No. 12)

No. 12 is a comparative example simulating the above-mentioned Patent Document 3, in which no graphite particles and no carbonaceous material were used, and the carbonaceous fibers were treated as follows to obtain an electrode material.

Specifically, in No. 1, a Malifleece woven fabric (thickness: 0.6 mm, basis weight: 120 g/m$^2$) made of flameproofed polyacrylonitrile fiber was subjected to carbonization (firing) at 1000° C. for one hour in a nitrogen atmosphere and then subjected to graphitization at 1500° C. for one hour, and an oxidation treatment was performed at 700° C. for 15 minutes to prepare an electrode material (a comparative example) No. 12 (thickness: 0.6 mm, basis weight: 60 g/m$^2$). The temperature rise rate when raising the temperature from the flameproofing temperature to the carbonization temperature was the same as in No. 1.

(No. 13)

An electrode material (a comparative example) No. 13 (thickness: 0.42 mm, basis weight: 40.0 g/m$^2$) was prepared in the same manner as in the above No. 1 except that MCP250 (carbonaceous material) manufactured by JFE Chemical Corporation: 3% by mass and the type C in Table 2 as graphite powder: 2.1% by mass were added.

Table 3 shows the results of measurement of various items for the above Nos. 1 to 13.

TABLE 3

| No. | Type of carbon particles | Carbonaceous fibers (A) Type | Lc (A) (nm) | Carbonaceous material (B) Type | Lc(C) (nm) | Lc (C)/Lc (A) | Basis weight of carbonaceous fiber structure (1) (g/m²) | Basis weight of carbonaceous material (2) (g/m²) | Basis weight of carbon particles (3) (g/m²) | Total basis weights (1) + (2) + (3) (g/m²) | Content of carbon particles (3)/((1) + (2) + (3)) (%) | Content of carbonaceous material (2)/((1) + (2) + (3)) (%) | Mass ratio of carbonaceous material to carbon particles (2)/(3) |
|---|---|---|---|---|---|---|---|---|---|---|---|---|---|
| 1 | C | Polyacrylonitrile fiber | 2.9 | Pitch material | 12 | 4.1 | 30 | 52.0 | 52.0 | 134.0 | 38.8 | 38.8 | 1.0 |
| 2 | A | Polyacrylonitrile fiber | | Pitch material | | | 30 | 57.0 | 57.0 | 144.0 | 39.6 | 39.6 | 1.0 |
| 3 | B | Polyacrylonitrile fiber | | Pitch material | | | 30 | 48.0 | 48.0 | 126.0 | 38.1 | 38.1 | 1.0 |
| 4 | D | Polyacrylonitrile fiber | | Pitch material | | | 30 | 98.1 | 49.0 | 177.1 | 27.7 | 55.4 | 2.0 |
| 5 | C | Polyacrylonitrile fiber | | Pitch material | | | 30 | 89.3 | 44.7 | 164.0 | 27.2 | 54.5 | 2.0 |
| 6 | B | Polyacrylonitrile fiber | | Pitch material | | | 10 | 20.7 | 20.7 | 51.4 | 40.3 | 40.3 | 1.0 |
| 7 | C | Anisotropic pitch fiber | 10 | Pitch material | 12 | 1.2 | 30 | 48.5 | 48.5 | 127.0 | 38.2 | 38.2 | 1.0 |
| 8 | a | Polyacrylonitrile fiber | 2.9 | Phenol resin | 1.5 | 0.5 | 30 | 45.5 | 45.5 | 121.0 | 37.6 | 37.6 | 1.0 |
| 9 | E | Polyacrylonitrile fiber | 2.9 | Pitch material | 12 | 4.1 | 30 | 61.0 | 61.0 | 152.0 | 40.1 | 40.1 | 1.0 |
| 10 | — | Polyacrylonitrile fiber | 2.9 | Pitch material | 12 | 4.1 | 30 | 57.0 | 0 | 87.0 | 0 | 65.6 | — |
| 11 | — | Polyacrylonitrile fiber | 2.9 | None | — | — | 55 | 0 | 0 | 55 | 0 | 0 | — |
| 12 | — | Polyacrylonitrile fiber | 2.0 | None | — | — | 60 | 0 | 0 | 60 | 0 | 0 | — |
| 13 | C | Polyacrylonitrile fiber | 2.9 | Pitch material | 12 | 4.1 | 30 | 5.0 | 5.0 | 40 | 12.5 | 12.5 | 1.0 |

| No. | Ratio of the number of oxygen atoms to the number of carbon atoms (O/C) (%) | Total cell resistance (Ω·cm²) | Oxidation resistance test (V vs Ag/AgCl) | Water passing rate (mm/sec) | BET specific surface area of electrode material (m²/g) |
|---|---|---|---|---|---|
| 1 | 2.8 | 0.82 | 1.232 | 1.1 | 3.5 |
| 2 | 2.4 | 0.82 | 1.233 | 1.2 | 3.0 |
| 3 | 2.2 | 0.80 | 1.232 | 1.1 | 2.6 |
| 4 | 2.6 | 0.85 | 1.228 | 1.0 | 3.1 |
| 5 | 2.8 | 0.84 | 1.229 | 0.9 | 2.2 |
| 6 | 2.9 | 0.81 | 1.220 | 1.5 | 2.7 |
| 7 | 2.4 | 0.83 | 1.233 | 1.0 | 3.3 |
| 8 | 6.6 | 0.75 | 0.711 | 1.8 | 12.3 |
| 9 | 4.4 | 0.78 | 0.876 | 0.9 | 17.9 |
| 10 | 2.2 | 0.95 | 1.242 | 0.7 | 0.4 |
| 11 | 0.2 | 0.91 | 1.211 | 0.3 | 0.8 |
| 12 | 0.9 | 0.90 | 0.733 | 1.5 | 4.1 |
| 13 | 3.3 | 0.96 | 1.213 | 1.1 | 1.1 |

Nos. 1 to 7 are electrode materials satisfying the requirements for the second electrode material. These electrode materials were all excellent in oxidation resistance while maintaining low resistance.

On the other hand, No. 8 used the type a (Lc=1.3 nm) of carbon black having low crystallinity (L), without using graphite, and the carbonaceous material having low crystallinity (Lc), and thus although the cell resistance was the lowest, the oxidation resistance was significantly reduced.

No. 9 is an example using the flaky graphite E whose Lc does not satisfy the requirements for the second electrode material. As in the above No. 8, although the cell resistance was low, the oxidation resistance was significantly reduced.

No. 10 is an example in which no graphite particles were used, and the carbonaceous material with a higher crystallinity as compared with No. 1 was used. The cell resistance rose, although the oxidation resistance was excellent.

No. 11 and No. 12 are examples in which neither graphite particles nor a carbonaceous material was used and the O/C ratio was low. In both cases, the cell resistance rose. In No. 11, the water passing rate also decreased. In particular, No. 12, which is an example simulating Patent Document 3, was inferior to the examples of the present invention in both the resistance and the oxidation resistance.

In No. 13, the graphite particles and the carbonaceous material satisfying the requirements for the second electrode material were used, but the contents thereof were small, and thus the resistance was increased and the oxidation resistance was reduced as compared with the examples of the present invention.

[Third Electrode Material]

Example 4

In this example, the types A to D of carbon blacks shown in Table 4 as the carbon particles (B) other than graphite particles, the type a (pitch material of MCP250 manufactured by JFE Chemical Corporation), the type b (phenolic resin of TD-4304 manufactured by DIC Corporation, solid content: 40%), or the type c (coal tar manufactured by Alfa Aesar) shown in Table 5 as the carbonaceous material (C) were used to prepare each of electrode materials composed of a carbonaceous sheet in the following manner, and various items were measured for the each prepared electrode material. The A to D were all commercially-available products, and the average particle diameters shown in Table 4 are values shown on the catalogs. Among them, the types A and C have the same average particle diameter as shown in Table 4. The C is a commercially-available powder, while the type A is a commercially-available water dispersion obtained by dispersing the commercially-available powder of the type C in water with a dispersant.

(No. 1)

Ion-exchange water: 19.2%, polyvinyl alcohol: 1.0%, the type A (solid content: 16.5%, a content of carbon other than graphite particles: about 8.5%, an example satisfying the requirements for the third electrode material) in Table 4 as carbon particles other than graphite particles: 65.8%, and the type A in Table 5 as a carbonaceous material: 14.0% (residual weight yield of carbonization: 80%) were stirred by a mechanical stirrer for one hour to prepare a dispersion liquid.

In the prepared dispersion liquid, carbon paper (CFP-030-PE manufactured by Nippon Polymer Sangyo Co., Ltd., basis weight: 30 g/m$^2$, thickness: 0.51 mm) made of polyacrylonitrile fiber (average fiber diameter: 10 μm) after being carbonized was immersed, then passed through a nip roller to remove excess dispersion liquid such that the weight of the nonwoven fabric after being immersed was 13 to 15 times the weight of the nonwoven fabric before being immersed, and dried at 150° C. for 20 minutes in an air atmosphere. Next, the temperature was raised to 1000° C.±50° C. at a rate of 5° C./min in nitrogen gas, and the nonwoven fabric was held at this temperature for one hour to perform carbonization (firing) and then cooled. Furthermore, the temperature was raised to 1500° C.±50° C. at a rate of 5° C./min in nitrogen gas, and the nonwoven fabric was held at this temperature for one hour to perform graphitization and then cooled. Next, an oxidation treatment was performed at 700° C. for 10 minutes in an air atmosphere to obtain an electrode material No. 1 (basis weight: 91.0 g/m$^2$, thickness: 0.47 mm).

(No. 2)

Ion-exchange water: 50.9%, polyvinyl alcohol (temporary adhesive): 1.0%, the type A in Table 4 as carbon particles other than graphite particles: 34.1%, and the type a in Table 5 as a carbonaceous material: 14.0% were stirred by a mechanical stirrer for one hour to prepare a dispersion liquid.

In the prepared dispersion liquid, the above carbon paper was immersed, and then subjected to the same treatments as in No. 1 to obtain an electrode material No. 2 (basis weight: 90.0 g/m$^2$, thickness: 0.45 mm).

(No. 3)

Ion-exchange water: 68.1%, polyvinyl alcohol: 1.0%, the type A in Table 4 as carbon particles other than graphite particles: 16.9%, and the type a in Table 5 as a carbonaceous material: 14.0% were stirred by a mechanical stirrer for one hour to prepare a dispersion liquid.

In the prepared dispersion liquid, the above carbon paper was immersed, and then subjected to the same treatments as in No. 1 to obtain an electrode material No. 3 (basis weight: 89.0 g/m$^2$, thickness: 0.48 mm).

(No. 4)

Ion-exchange water: 24.1%, polyvinyl alcohol: 1.0%, the type B (solid content: 11.5%, an example satisfying the requirements for the third electrode material) in Table 4 as carbon particles other than graphite particles: 60.9%, and the type a in Table 5 as a carbonaceous material: 14.0% were stirred by a mechanical stirrer for one hour to prepare a dispersion liquid.

In the prepared dispersion liquid, the above carbon paper was immersed, and then subjected to the same treatments as in No. 1 to obtain an electrode material No. 4 (basis weight: 88.0 g/m$^2$, thickness: 0.45 mm).

(No. 5)

No. 5 is an example composed only of carbonaceous fiber without using carbon particles other than graphite particles and a carbonaceous material. Specifically, the same heat treatments as in No. 1 were performed directly on the above carbon paper to obtain an electrode material No. 5 (basis weight: 27 g/m$^2$, thickness: 0.46 mm).

(No. 6)

No. 6 is an example composed only of carbonaceous fibers and a carbonaceous material without using carbon particles other than graphite particles.

First, ion-exchange water: 83.0%, polyvinyl alcohol: 1.0%, Rheodol TW-L120 manufactured by Kao Corporation: 2.0%, and the type a in Table 5 as a carbonaceous material: 14.0% were stirred by a mechanical stirrer for one hour to prepare a dispersion liquid.

In the prepared dispersion liquid, the carbon paper in No. 1 was immersed, and then subjected to the same treatments as in No. 1 to obtain an electrode material No. 6 (basis weight: 70.0 g/m², thickness: 0.45 mm).

(No. 7)

Ion-exchange water: 76.0%, polyvinyl alcohol: 1.0%, Rheodol TW-L120 manufactured by Kao Corporation: 2.0%, the type D in Table 4 as carbon particles other than graphite particles (an example not satisfying the requirements for the third electrode material): 7.0%, and the type a in Table 5 as a carbonaceous material: 14.0% were stirred by a mechanical stirrer for one hour to prepare a dispersion liquid.

In the prepared dispersion liquid, the carbon paper in No. 1 was immersed, and then subjected to the same treatments as in No. 1 to obtain an electrode material No. 7 (basis weight: 89.0 g/m², thickness: 0.46 mm).

(No. 8)

Ion-exchange water: 8.9%, polyvinyl alcohol: 1.0%, the type A in Table 4 as carbon particles other than graphite particles: 34.1%, and the type b (solid content: 40%) in Table 5 as a carbonaceous material: 56.0% were stirred by a mechanical stirrer for one hour to prepare a dispersion liquid.

In the prepared dispersion liquid, the carbon paper in No. 1 was immersed, and then subjected to the same treatments as in No. 1 to obtain an electrode material No. 8 (basis weight: 86.6 g/m², thickness: 0.48 mm).

(No. 9)

Ion-exchange water: 42.6%, polyvinyl alcohol: 1.0%, the type A in Table 4 as carbon particles other than graphite particles: 42.4%, and the type a in Table 5 as a carbonaceous material: 14.0% were stirred by a mechanical stirrer for one hour to prepare a dispersion liquid.

In the prepared dispersion liquid, the carbon paper in No. 1 was immersed, and then subjected to carbonization and graphitization in the same manner as in No. 1, but no oxidation treatment in an air atmosphere was performed thereafter to obtain an electrode material No. 9 (basis weight: 89.0 g/m², thickness: 0.44 mm).

(No. 10)

Ion-exchange water: 42.6%, polyvinyl alcohol: 1.0%, the type A in Table 4 as carbon particles other than graphite particles: 42.4%, and the type a in Table 5 as a carbonaceous material: 14.0% were stirred by a mechanical stirrer for one hour to prepare a dispersion liquid.

In the prepared dispersion liquid, the carbon paper in No. 1 was immersed, and then subjected to the same treatments as in No. 1 except that the carbon paper was passed through a nip roller to remove excess dispersion liquid such that the weight of the carbon paper after being immersed was 1.5 to 1.7 times the weight of the carbon paper before being immersed, and thus, an electrode material No. 10 (basis weight: 31.0 g/m², thickness: 0.42 mm) was obtained.

(No. 11)

Ion-exchange water: 66.7%, polyvinyl alcohol (temporary adhesive): 1.0%, the type A in Table 4 as carbon particles other than graphite particles: 16.6%, and the type a in Table 5 as a carbonaceous material: 15.7% were stirred by a mechanical stirrer for one hour to prepare a dispersion liquid.

In the prepared dispersion liquid, the carbon paper in No. 1 was immersed, and then subjected to the same treatments as in No. 1 to obtain an electrode material No. 11 (basis weight: 87.0 g/m², thickness: 0.43 mm).

(No. 12)

The type C (an example satisfying the requirements for the third electrode material) in Table 4 as carbon particles other than graphite particles: 4.8% and the type c (coal tar) in Table 5 as a carbonaceous material: 95.2% were stirred by a mechanical stirrer for one hour to prepare a dispersion liquid. In No. 12, the reason for using the type C (powder) in Table 4 as carbon particles other than graphite particles is that the type A (aqueous dispersion) in Table 4 is incompatible with coal tar (the type c in Table 5), which is a carbonaceous material, and is difficult to mix with coal tar, and therefore, the type C before being dispersed in water was used.

In the prepared dispersion liquid, the carbon paper in No. 1 was immersed, and then subjected to the same treatments as in No. 1 to obtain an electrode material No. 12 (basis weight: 89.0 g/m², thickness: 0.47 mm).

Table 6 shows the results of measurement of various items for the above Nos. 1 to 12.

TABLE 4

| | Carbon particles (B) | |
|---|---|---|
| Symbol | Average particle diameter | Lc (B) (nm) |
| A | 400 nm or less | 2.0 |
| B | 400 nm or less | 2.2 |
| C | 400 nm or less | 2.0 |
| D | 5 μm | 35.1 |

TABLE 5

| | Carbonaceous material (C) | |
|---|---|---|
| Symbol | Type | Lc (C) (nm) |
| a | Pitch material | 6.0 |
| b | Phenol resin | 1.5 |
| c | Coal tar | 18.0 |

Table 6

| No. | Type of carbon particles | Type of carbonaceous materials | Carbonaceous fibers (A) Type | Lc (A) (nm) | Lc (C)/ Lc (A) | Basis weight of carbonaceous fiber structure (1) (g/m²) | Basis weight of carbonaceous material (2) (g/m²) | Basis weight of carbon particles (3) (g/m²) | Total basis weights (1) + (2) + (3) (%) | Content of carbon particles (3)/ ((1) + (2) + (3)) (%) | Content of carbonaceous material (2)/((1) + (2) + (3)) (%) | Mass ratio of carbonaceous material to carbon particles |
|---|---|---|---|---|---|---|---|---|---|---|---|---|
| 1 | A | a | Polyacrylonitrile fiber | 1.7 | 3.5 | 27 | 42.2 | 21.8 | 91.0 | 24.0 | 46.4 | 1.9 |
| 2 | A | a | Polyacrylonitrile fiber | 1.7 | 3.5 | 28 | 49.2 | 12.8 | 90.0 | 14.2 | 54.7 | 3.8 |
| 3 | A | a | Polyacrylonitrile fiber | 1.7 | 3.5 | 27 | 54.9 | 7.1 | 89.0 | 8.0 | 61.7 | 7.7 |
| 4 | B | a | Polyacrylonitrile fiber | 1.7 | 3.5 | 28 | 52.1 | 7.9 | 88.0 | 9.0 | 59.2 | 6.6 |
| 5 | — | — | Polyacrylonitrile fiber | 1.7 | — | 27 | 0 | 0 | 27.0 | 0 | 0 | — |
| 6 | — | a | Polyacrylonitrile fiber | 1.7 | 3.5 | 29 | 41.0 | 0 | 70.0 | 0 | 58.6 | — |
| 7 | D | a | Polyacrylonitrile fiber | 1.7 | 3.5 | 28 | 41.0 | 20.0 | 89.0 | 22.5 | 46.1 | 2.1 |
| 8 | A | b | Polyacrylonitrile fiber | 1.7 | 0.9 | 26 | 48.5 | 12.1 | 86.6 | 14.0 | 56.0 | 4.0 |
| 9 | A | a | Polyacrylonitrile fiber | 1.7 | 3.5 | 27 | 49.2 | 12.8 | 89.0 | 14.4 | 55.3 | 3.8 |
| 10 | A | a | Polyacrylonitrile fiber | 1.7 | 3.5 | 28 | 2.4 | 0.6 | 31.0 | 1.9 | 7.7 | 4.0 |
| 11 | A | a | Polyacrylonitrile fiber | 1.7 | 3.5 | 27 | 55.0 | 5.0 | 87.0 | 5.7 | 63.2 | 11.0 |
| 12 | C | c | Polyacrylonitrile fiber | 2.5 | 7.2 | 29 | 40.0 | 20.0 | 89.0 | 22.5 | 44.9 | 2.0 |

| No. | Ratio of the number of oxygen atoms to the number of carbon atoms (O/C) (%) | Total cell resistance (Ω · cm²) | Water passing rate (mm/sec) | BET specific surface area of electrode material (m²/g) |
|---|---|---|---|---|
| 1 | 4.5 | 0.63 | 0.8 | 121.3 |
| 2 | 4.2 | 0.65 | 0.7 | 18.9 |
| 3 | 4.7 | 0.70 | 0.9 | 1.6 |
| 4 | 5.3 | 0.58 | 0.8 | 74.6 |
| 5 | 3.8 | 1.12 | 0.8 | 0.5 |
| 6 | 2.2 | 1.15 | 0.7 | 0.3 |
| 7 | 3.3 | 1.05 | 0.8 | 2.1 |
| 8 | 4.7 | 0.98 | 1.1 | 16.5 |
| 9 | 0.3 | 1.18 | No water passed | 17.7 |
| 10 | 3.3 | 0.99 | 1.2 | 1.1 |
| 11 | 3.8 | 1.15 | 1.1 | 0.4 |
| 12 | 3.5 | 1.32 | 0.6 | 8.9 |

Nos. 1 to 4 are electrode materials satisfying the requirements for the third electrode material. These electrode materials all exhibited lower resistance than the resistances of the comparative examples of Nos. 5 to 12. The reason therefor is considered that Nos. 1 to 4 used the types A and B in Table 4 having a smaller particle diameter as carbon particles other than graphite, and therefore the reaction surface areas were large, and the electrode activities improved due to exposure of carbon edge planes.

On the other hand, No. 5 is an example composed only of carbonaceous fibers without using carbon particles other than graphite particles and a carbonaceous material, and the resistance significantly increased due to insufficient reaction surface area. Since No. 6 contained no carbon particles other than graphite particles, the reaction surface area was insufficient and the resistance was significantly increased.

No. 7 used the type D in Table 4 having a larger particle diameter and a larger Lc (B) as carbon particles, so that the resistance increased. The reason therefor is considered that, since carbon particles having a large particle diameter were used, the reaction surface area became small as compared with the examples of the present invention, and in addition, since use of carbon particles having high carbon crystallinity made it difficult to introduce an oxygen functional group, the affinity in the vicinity of the carbon particles for the aqueous electrolyte decreased, and the reaction activity was not improved.

No. 8 is an example having a small ratio of Lc (C)/Lc (A), and the resistance was increased. The reason therefor is considered that, since the carbon crystallinity of the carbonaceous material was low as compared with the examples of the present invention, the electronic conduction resistance between the carbon particles and the carbonaceous fiber increased, and the reaction activity of the carbon particles could not be efficiently used.

No. 9 is an example having a small ratio of O/C, the resistance increased, and water was not passed through it. The reason therefor is considered that, since the amount of oxygen functional groups was small, the affinity with the electrolyte was reduced as compared with the examples of the present invention, and the reaction activity was reduced.

No. 10 is an example having a small content of carbon particles other than graphite, and the resistance increased. The reason therefor is considered that, since the content of the carbon particles was small, the reaction surface area decreased, and the electronic conduction path became insufficient with the decrease in the content.

No. 11 is an example having a large content of the carbonaceous material to the carbon particles other than graphite, and again, the resistance increased. The reason therefor is considered that, since the content of the carbonaceous material was significantly larger than the content of the carbon particles other than graphite, reactive active spots on the surfaces of the carbon particles were covered with the carbonaceous material, the reaction surface area was not effectively used, and thus the resistance increased.

No. 12 is an example having a ratio of Lc (C)/Lc (A) of 7.2 and a significantly higher carbon crystallinity of the carbonaceous material than carbon crystallinity of the carbonaceous fibers, and again, the resistance increased. When carbon particles other than graphite are covered with a very high-crystalline carbonaceous material, the reactive surface area of the carbon particles is not effectively used, and in general, it is difficult to introduce an oxygen functional group into a high-crystalline portion. Therefore, it is considered that the affinity with the electrolyte decreased and the resistance increased.

INDUSTRIAL APPLICABILITY

According to the first electrode material, it is possible to provide an electrode material having an excellent oxidation resistance while suppressing a rise in cell resistance. Therefore, the electrode material is particularly useful as an electrode material for a redox flow battery using a Mn—Ti electrolyte. The carbon electrode material of the first electrode material is suitably used in a flow type or non-flow type redox flow battery, or a redox flow battery combined with a system of lithium, a capacitor, and a fuel cell.

According to the second electrode material, it is possible to provide a carbon electrode material having a low resistance and a long lifetime while maintaining a high oxidation resistance. Therefore, the electrode material is particularly useful as an electrode material for a redox flow battery using a Mn—Ti electrolyte. The second carbon electrode material is suitably used in a flow type or non-flow type redox flow battery, or a redox flow battery combined with a system of lithium, a capacitor, and a fuel cell.

According to the third electrode material, it is possible to provide a carbon electrode material capable of reducing a cell resistance during initial charge and discharge and having an excellent battery energy efficiency. Therefore, the electrode material is useful as a carbon electrode material used in a negative electrode of a Mn—Ti redox flow battery. The third carbon electrode material is suitably used in a flow type or non-flow type redox flow battery, or a redox flow battery combined with a system of lithium, a capacitor, and a fuel cell.

DESCRIPTION OF REFERENCE NUMERALS

1: collector plate
2: spacer
3: ion exchange membrane
4a, 4b: liquid passage
5: electrode material
6: tank for positive-electrode electrolyte
7: tank for negative-electrode electrolyte
8, 9: pump
10: liquid inlet
11: liquid outlet
12, 13: external flow path

The invention claimed is:

1. A carbon electrode material for a redox flow battery comprising carbonaceous fibers (A) and a carbonaceous material (B) that binds the carbonaceous fibers (A), the carbon electrode material satisfying the following requirements:
   (1) when a crystallite size in a c-axis direction determined by X-ray diffraction in the carbonaceous material (B) is taken as Lc (B), the Lc (B) is 10 nm or more;
   (2) when a crystallite size in a c-axis direction determined by X-ray diffraction in the carbonaceous fibers (A) is taken as Lc (A), Lc (B)/Lc (A) is 1.0 or more; and
   (3) the number of bound oxygen atoms onto a surface of the carbon electrode material is 1.0% or more of the total number of carbon atoms on the surface of the carbon electrode material.

2. The carbon electrode material according to claim 1, wherein the carbonaceous material (B) is contained in a mass ratio of 20% or more, relative to the total amount of the carbonaceous fibers (A) and the carbonaceous material (B).

3. The carbon electrode material according to claim 1, wherein the Lc (A) is 1 to 10 nm.

4. A method for producing the carbon electrode material according to claim 1, the method comprising in the following order:
- a step of impregnating the carbonaceous fibers (A) with the carbonaceous material (B) before being carbonized;
- a carbonization step of heating a product after being impregnated, in an inert atmosphere, at a temperature of 800° C. or higher and 2000° C. or lower;
- a graphitization step of heating the product, in an inert atmosphere, at a temperature that is 1800° C. or higher and that is higher than the heating temperature of the carbonization step; and
- an oxidation treatment step of the product.

5. A carbon electrode material for a redox flow battery comprising carbonaceous fibers (A), graphite particles (B), and a carbonaceous material (C) that binds the carbonaceous fibers (A) and the graphite particles (B), the carbon electrode material satisfying the following requirements:
(1) the graphite particles (B) has a particle diameter of 1 μm or more;
(2) when a crystallite size in a c-axis direction determined by X-ray diffraction in the graphite particles (B) is taken as Lc (B), the Lc (B) is 35 nm or more;
(3) when a crystallite size in a c-axis direction determined by X-ray diffraction in the carbonaceous material (C) is taken as Lc (C), the Lc (C) is 10 nm or more;
(4) when a crystallite size in a c-axis direction determined by X-ray diffraction in the carbonaceous fibers (A) is taken as Lc (A), Lc (C)/Lc (A) is 1.0 or more; and
(5) the number of bound oxygen atoms onto a surface of the carbon electrode material is 1.0% or more of the total number of carbon atoms on the surface of the carbon electrode material.

6. The carbon electrode material according to claim 5, wherein the graphite particles (B) are contained in a mass ratio of 20% or more, and the carbonaceous material (C) is contained in a mass ratio of 20% or more, relative to the total amount of the carbonaceous fibers (A), the graphite particles (B), and the carbonaceous material (C), and
wherein the mass ratio of the carbonaceous material (C) to the graphite particles (B) is from 0.2 to 3.0.

7. The carbon electrode material according to claim 5, wherein the Lc (A) is 1 to 10 nm.

8. The carbon electrode material according to claim 5, wherein a BET specific surface area determined from an adsorbed nitrogen amount is from 1.0 to 8 m²/g.

9. The carbon electrode material according to claim 5, wherein the graphite particles (B) comprise at least one selected from the group consisting of flaky graphite, exfoliated graphite, and expanded graphite.

10. A method for producing the carbon electrode material according to claim 5 the method comprising in the following order:
- a step of impregnating the carbonaceous fibers (A) with the graphite particles (B) and the carbonaceous material (C) before being carbonized;
- a carbonization step of heating a product after being impregnated, in an inert atmosphere, at a temperature of 800° C. or higher and 2000° C. or lower;
- a graphitization step of heating the product, in an inert atmosphere, at a temperature that is 1800° C. or higher and that is higher than the heating temperature of the carbonization step; and
- an oxidation treatment step of the product.

11. A carbon electrode material for a manganese-titanium redox flow battery, the carbon electrode material being used in a negative electrode of a redox flow battery using a manganese-titanium electrolyte,
wherein the carbon electrode material comprises carbonaceous fibers (A), carbon particles (B) other than graphite particles, and a carbonaceous material (B) that binds the carbonaceous fibers (A) and the carbon particles (B) other than graphite particles, and satisfies the following requirements:
(1) the carbon particles (B) other than graphite particles have a particle diameter of 1 μm or less;
(2) when a crystallite size in a c-axis direction determined by X-ray diffraction in the carbon particles (B) other than graphite particles is taken as Lc (B), the Lc (B) is 10 nm or less;
(3) when crystallite sizes in a c-axis direction determined by X-ray diffraction in the carbonaceous fibers (A) and the carbonaceous material (C) are taken as Lc (A) and Lc (C), respectively, Lc (C)/Lc (A) is 1.0 to 5;
(4) the carbonaceous material (C) is contained in a mass ratio of 14.5% or more relative to the total amount of the carbonaceous fibers (A), the carbon particles (B) other than graphite particles, and the carbonaceous material (C); and
(5) the number of bound oxygen atoms onto a surface of the carbon electrode material is 1.0% or more of the total number of carbon atoms on the surface of the carbon electrode material.

12. The carbon electrode material according to claim 11, wherein the mass ratio of the carbonaceous material (C) to the carbon particles (B) is from 0.2 to 10.

13. The carbon electrode material according to claim 11, wherein a BET specific surface area determined from an adsorbed nitrogen amount is 0.5 m²/g or more.

14. A method for producing the carbon electrode material according to claim 11, the method comprising in the following order:
- a step of impregnating the carbonaceous fibers (A) with the carbon particles (B) other than graphite particles and the carbonaceous material (C) before being carbonized;
- a carbonization step of heating a product after being impregnated, in an inert atmosphere, at a temperature of 800° C. or higher and 2000° C. or lower;
- a graphitization step of heating the product, in an inert atmosphere, at a temperature that is 1300° C. or higher and that is higher than the heating temperature of the carbonization step; and
- an oxidation treatment step of the product.

15. The carbon electrode material according to, claim 1, wherein a water passing rate when a water droplet is dropped on the carbon electrode material is 0.5 mm/sec or more.

16. The carbon electrode material according to claim 1, which is used in a negative electrode of a redox flow battery using a manganese-titanium electrolyte.

17. A redox flow battery comprising the carbon electrode material according to claim 1.

18. A manganese-titanium redox flow battery using the carbon electrode material according to claim 1.

* * * * *